US007872445B2

(12) United States Patent
Hui

(10) Patent No.: US 7,872,445 B2
(45) Date of Patent: *Jan. 18, 2011

(54) RECHARGEABLE BATTERY POWERED PORTABLE ELECTRONIC DEVICE

(75) Inventor: Shu-yuen Ron Hui, New Territories (HK)

(73) Assignee: City University of Hong Kong, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 12/486,572

(22) Filed: Jun. 17, 2009

(65) Prior Publication Data

US 2009/0251102 A1 Oct. 8, 2009

Related U.S. Application Data

(63) Continuation of application No. 11/610,860, filed on Dec. 14, 2006, now Pat. No. 7,576,514, which is a continuation of application No. 11/009,478, filed on Dec. 10, 2004, now Pat. No. 7,614,255, which is a continuation of application No. PCT/AU03/00721, filed on Jun. 10, 2003.

(30) Foreign Application Priority Data

| Jun. 10, 2002 | (GB) | ................................. 0213374.2 |
| Nov. 18, 2002 | (GB) | ................................. 0226893.6 |
| Mar. 10, 2003 | (GB) | ................................. 0305428.5 |

(51) Int. Cl.
  *H01M 10/46* (2006.01)
(52) U.S. Cl. ................................... 320/108

(58) Field of Classification Search ................. 320/108, 320/112, 114, 115, 111
See application file for complete search history.

(56) References Cited

U.S. PATENT DOCUMENTS

| 4,873,677 A | 10/1989 | Sakamoto et al. ........... 368/204 |
| 5,528,113 A | 6/1996 | Boys et al. ..................... 318/16 |

(Continued)

FOREIGN PATENT DOCUMENTS

GB      2 399 225      8/2004

(Continued)

OTHER PUBLICATIONS

Choi et al., "A new contactless battery charger for portable telecommunications/computing electronics," ICCE International Conference on Consumer Electronics 2001, pp. 58-59.

(Continued)

*Primary Examiner*—Edward Tso
(74) *Attorney, Agent, or Firm*—Heslin Rothenber Farley & Mesiti P.C.

(57) ABSTRACT

There is provided a planar inductive battery charging system designed to enable electronic devices to be recharged. The system includes a planar charging module having a charging surface on which a device to be recharged is placed. Within the charging module and parallel to the charging surface is at least one and preferably an array of primary windings that couple energy inductively to a secondary winding formed in the device to be recharged. The invention also provides secondary modules that allow the system to be used with conventional electronic devices not formed with secondary windings.

4 Claims, 32 Drawing Sheets

U.S. PATENT DOCUMENTS

| | | | |
|---|---|---|---|
| 5,550,452 A | 8/1996 | Shirai et al. | 320/108 |
| 5,959,433 A | 9/1999 | Rohde | 320/108 |
| 6,008,622 A | 12/1999 | Nakawatase | 320/108 |
| 6,172,884 B1 | 1/2001 | Lanni | 363/21.05 |
| 6,184,651 B1 | 2/2001 | Fernandez et al. | 320/108 |
| 6,265,789 B1 | 7/2001 | Honda et al. | 307/33 |
| 6,389,318 B1 | 5/2002 | Zarinetchi et al. | 607/61 |
| 6,501,364 B1 | 12/2002 | Hui et al. | 336/200 |
| 6,803,744 B1 | 10/2004 | Sabo | 320/108 |
| 7,164,255 B2 | 1/2007 | Hui | 320/108 |
| 7,576,514 B2 * | 8/2009 | Hui | 320/108 |
| 2004/0150934 A1 | 8/2004 | Baarman | 361/115 |

FOREIGN PATENT DOCUMENTS

| | | |
|---|---|---|
| JP | 11095922 | 4/1999 |
| WO | WO 2004/055654 A3 | 1/2004 |
| WO | WO 2004/073176 A3 | 8/2004 |

OTHER PUBLICATIONS

Hatanaka, K. et al., "Power Transmission of a desk with a cord-free power supply," IEEE Transactions on Magnetics, vol. 38, Issue 5, Sep. 2002, pp. 3329-3331.

Hatanaka, K. et al., "Characteristics of the desk with cord-free power supply," Intermag 2002, Digest of Technical Papers, Apr. 28-May 2, 2002.

* cited by examiner

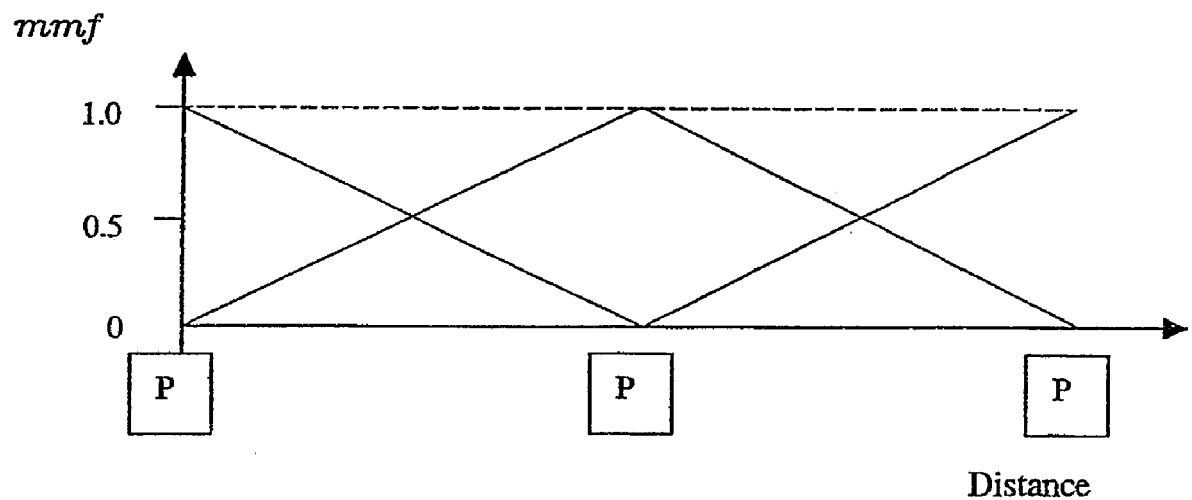
FIG. 33
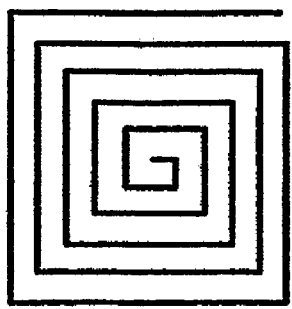 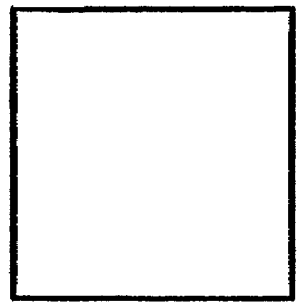
FIG. 34  FIG. 35

RECHARGEABLE BATTERY POWERED PORTABLE ELECTRONIC DEVICE

CROSS-REFERENCE TO RELATED APPLICATIONS

This application is a continuation of co-pending U.S. patent application Ser. No. 11/610,860, filed Dec. 14, 2006, entitled "PLANAR INDUCTIVE BATTERY CHARGING" (as amended), which is a continuation of U.S. Pat. No. 7,164, 255, granted Jan. 16, 2007, entitled "INDUCTIVE BATTERY CHARGER SYSTEM WITH PRIMARY TRANSFORMER WINDINGS FORMED IN A MULTI-LAYER STRUCTURE" (as amended), which is a continuation of PCT International Application PCT/AU03/00721, filed Jun. 10, 2003, and published under PCT Article 21(2) in English as WO 03/105308 on Dec. 18, 2003. PCT/AU03/00721 claimed benefit from British Applications 0213374.2, filed on Jun. 10, 2002; 0226893.6, filed on Nov. 18, 2002; and 0305428.5, filed on Mar. 10, 2003. Accordingly, priority for this continuation application is claimed from British Application Numbers 0213374.2, 0226893.6, and 0305428.5. The disclosures of each of the prior related applications are incorporated herein in their entirety by reference.

BACKGROUND OF THE INVENTION

1. Technical Field

This invention relates to a battery charger, and in particular to a battery charger having a planar surface on which one or more battery powered devices may be placed for battery recharging through induction. The invention also extends to a battery charging system for use with conventional electronic devices and that allows conventional electronic devices to be charged using the battery charging system of the present invention.

2. Background Information

Portable electronic equipment such as mobile phones, handheld computers, personal data assistants, and devices such as a wireless computer mouse, are normally powered by batteries. In many cases, rechargeable batteries are preferred because of environmental and economical concerns. The most common way to charge rechargeable batteries is to use a conventional charger, which normally consists of an AC-DC power supply (in case of using the ac mains) or a DC-DC power supply (in case of using a car battery). Conventional chargers normally use a cord (an electric cable for a physical electrical connection) to connect the charger circuit (a power supply) to the battery located in the portable electronic equipment. The basic schematic of the conventional battery charger is shown in FIG. 1.

Inductive electronic chargers without direct physical electrical connection have been developed in some portable electronic equipment such as electric toothbrushes where because they are designed to be used in the bathroom in the vicinity of sinks and water, it is not safe to provide a conventional electrical connection. Various known inductive type chargers, however, use traditional transformer designs with windings wound around ferrite magnetic cores as shown in FIG. 2. The main magnetic flux between the primary winding and secondary winding has to go through the magnetic core materials. Other contactless chargers proposed also use magnetic cores as the main structure for the coupled transformer windings.

A contactless charger using a single primary printed winding without any EMI shielding has been proposed for portable telecommunications/computing electronics. However, the magnetic flux distribution of a single spiral winding has a major problem of non-uniform magnetic flux distribution. As illustrated further below, the magnitude of the magnetic field in the centre of the core of a spiral winding is highest and decreases from the centre. This means that if the portable electronic device is not placed properly in the central region, the charging effect is not effective in this non-uniform field distribution. Furthermore, without proper EMI shielding, undesirable induced currents may flow in other metallic parts of the portable electronic equipment.

SUMMARY OF THE INVENTION

According to the present invention there is provided a battery powered portable electronic device comprising a rechargeable battery, the portable device including a planar secondary winding for receiving electrical energy from a battery charger, and electromagnetic shielding between the winding and the major electronic components of the device, the secondary winding lying in a plane parallel to a surface of the device adapted to be placed on a charging surface of a battery charging system, the device being capable to being carried or moved by hand.

In a preferred embodiment the primary winding is formed on a planar printed circuit board.

Preferably the magnetic flux generated by the primary winding is substantially uniform over at least a major part of the planar charging surface. In this way the precise position and orientation of the electronic device on the charging surface is not critical. To achieve this the charging module may comprise a plurality of primary windings, which may preferably be disposed in a regular array.

In a preferred embodiment the primary winding is provided with electromagnetic shielding on the side of said winding opposite from said planar charging surface. This shielding may include a sheet of ferrite material, and more preferably also may further include a sheet of conductive material such as copper or aluminium.

It is an advantage of the present invention that in preferred embodiments the planar charging surface may be large enough to receive two or more electronic devices, and the primary charging circuit is adapted to charge two or more devices simultaneously. In this way it is possible to charge more than one device simultaneously. For example the planar charging surface may be divided into a plurality of charging regions, which regions may be defined by providing a plurality of primary transformer windings arranged in a regular array and connecting the windings in groups to define said charging regions. A further advantage of the present invention is that it enables the possibility of allowing a device to move over the charging surface while being charged at the same time. This possibility is particularly useful to a device which is designed to be moved such as a wireless computer mouse Viewed from another aspect the present invention provides a battery charging system comprising a charging module comprising a primary charging circuit and being formed with a charging surface for receiving an electronic device to be charged, wherein said charging module comprises a plurality of transformer primary windings arranged in a regular array.

In addition to the battery charging system, the invention also extends to a battery powered portable electronic device comprising a rechargeable battery, and wherein the device includes a planar secondary winding for receiving electrical energy from a battery charger, and electromagnetic shielding between the winding and the major electronic components of said device.

Preferably the shielding comprises a sheet of ferrite material and a sheet of conductive material such as copper.

Preferably the winding is formed integrally with a back cover of said device.

An important aspect of the present invention is that it provides a battery charging system that employs a localized charging concept. In particular, when there is an array of primary coils, it will be understood that energy is only transferred from those primary coils that are adjacent the secondary coil located in the device being charged. In other words, when a device is placed on a planar charging surface that is greater in size than the device, energy is only transferred from that part of the planar charging surface that is directly beneath the device, and possibly also immediately adjacent areas that are still able to couple to the secondary coil.

Viewed from another aspect the present invention provides a battery charging system comprising a primary module and at least one secondary module, said primary module comprising means for connecting to a mains supply, and at least one primary winding adjacent to a charging surface of said primary module, and wherein said secondary module comprises a secondary winding adjacent to a surface of said secondary module, circuit means for converting alternating current generated in said secondary winding to a regulated DC output, and a charging connector for connection to the charging socket of an electronic device.

According to another aspect the invention also extends to a secondary module for a battery charging system, comprising: a housing having at least one charging surface, a winding provided in said housing adjacent to said surface and adapted to receive magnetic flux when said surface is brought adjacent to a primary winding, circuit means for converting alternating current in said secondary winding to a regulated DC output, and a connector means for connecting said DC output to the charging socket of an electronic device.

BRIEF DESCRIPTION OF THE DRAWINGS

Some embodiments of the invention will now be described by way of example and with reference to the accompanying drawings, in which:

FIG. 33 is a plot showing the uniformity of the flux distribution along a line;

FIG. 34 shows a square spiral winding;

FIG. 35 is a simplified version of FIG. 34;

DETAILED DESCRIPTION OF PREFERRED EMBODIMENTS

The present invention will now be described in respect of a preferred embodiment in the form of an inductive battery charger for portable electronic equipment such as mobile phones, handheld computers and personal digital assistants (PDA), and devices such as a wireless computer mouse.

Figure 1:
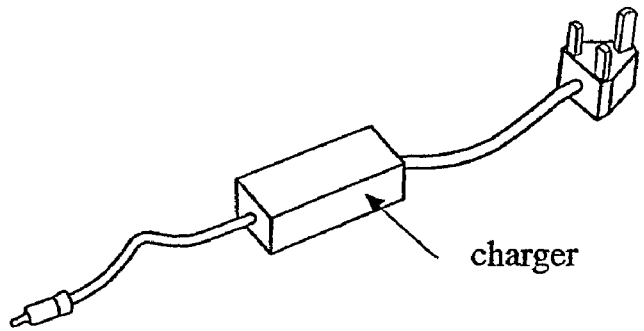
FIG. 1 is a schematic view of a conventional prior art battery charger with direct electrical connection.
Figure 2:
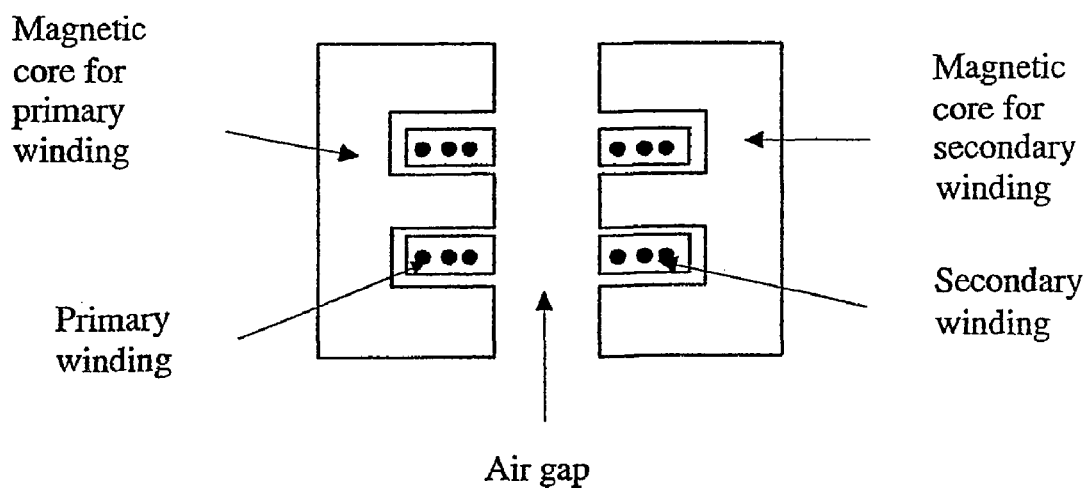
FIG. 2 is a schematic view of a conventional magnetic core-based transformer as used in prior art inductive battery charger systems.
Figure 3:
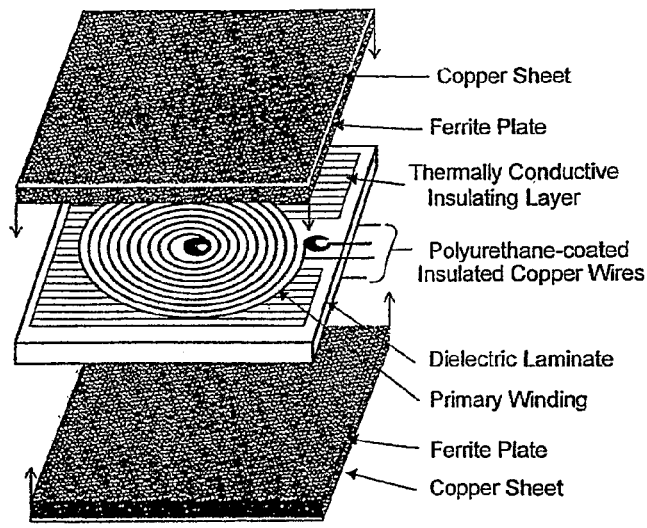
FIG. 3 is a schematic view of a planar transformer with shielding.
Figure 4A:
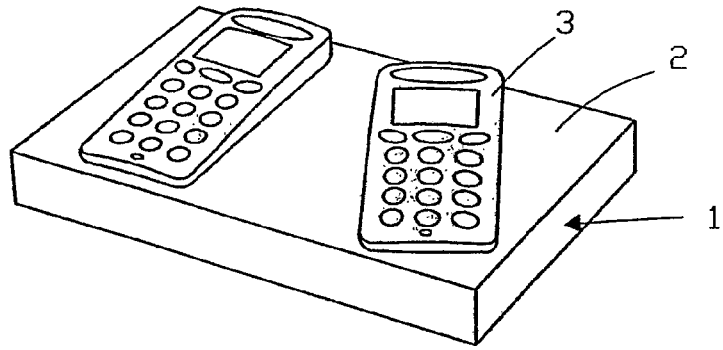
FIGS. 4(a)-(c) are (a) a perspective view of a battery charger system according to an embodiment of the present invention, (b) a view similar to (a) but showing the structure of the primary charging system, and (c) a view similar to (a) and (b) but showing the top cover removed for clarity.

Referring firstly to FIG. 4, the inductive charger system comprises two modules, a power delivering charger module that contains the primary circuit of a planar isolation transformer and a secondary circuit that is located in the portable electronic equipment to be charged. In this embodiment of the invention, the charger circuit is located within a housing 1 that is formed with a flat charging surface 2. The secondary circuit is formed in the portable equipment to be charged (in this example a mobile phone 3) and the equipment is formed with at least one planar surface. As will be seen from the following description the equipment is charged simply by placing the equipment on the surface so that the planar surface on the equipment is brought into contact with the flat charging surface 2. It is a particularly preferred aspect of the present invention that the equipment to be charged does not have to be positioned on the charging surface in any special orientation. Furthermore, in preferred embodiments of the invention two or more mobile devices may be charged simultaneously on the same charging surface, and in another embodiment, a device that is designed to be moved (such as a wireless computer mouse) can be charged while being moved over the charging surface (which could be integrated into a computer mouse pad). It will also be seen from the following description that the energy transfer is localized in the sense that energy is only transferred from the charging surface to the device from that part of the charging surface that is directly beneath the device (and possibly to a lesser extent regions adjacent thereto).

Figure 4B:
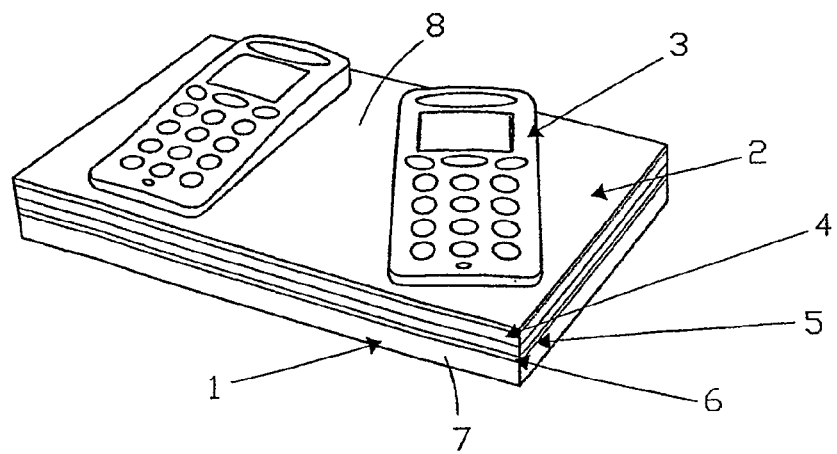
Figure 4C:
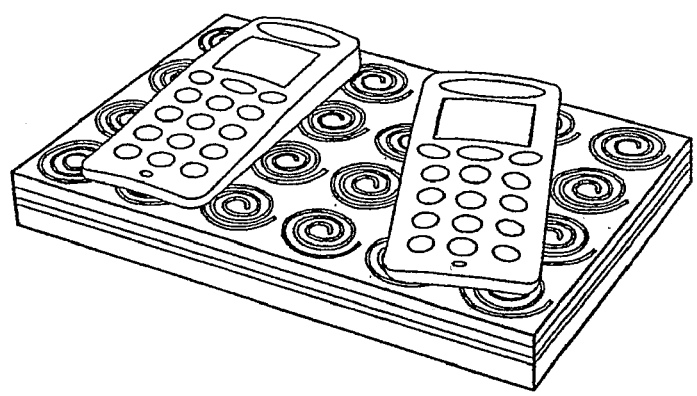
Figure 5A:
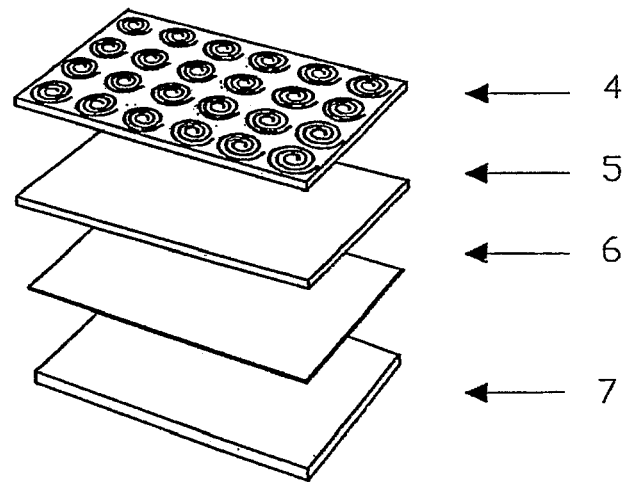
FIGS. 5(a) & (b) show the structure of the primary charger with the top cover removed for clarity, and in FIG. 5(a) with the structure shown in exploded view.

Referring in particular to FIG. 4(b) the primary charging module comprises a printed circuit board 4 formed with at least one spiral conductive track formed thereon as a primary winding. It will be understood, however, that the primary winding need not necessarily be formed on a PCB and could be formed separately. Alternatively, multiple PCBs each formed with at least one winding could be "stacked" on top of each other to increase the total flux. Preferably, as will be described further below, there are in fact a plurality of such spiral tracks disposed in an array as shown in FIG. 4(c) in which a top insulating sheet has been removed for clarity. Beneath the PCB 4 (i.e., the side of the PCB away from the charging surface) is provided EMI shielding comprising firstly a ferrite sheet 5 adjacent the PCB 4, and then a conductive sheet 6 which in this example may be a copper sheet. Beneath the copper sheet 6 may be provided any suitable form of substrate material 7, e.g., a plastics material. Above the PCB 4 may be provided a sheet of insulating material 8 which forms the charging surface. Preferably the PCB 4, the EMI shielding sheets 5,6, the substrate 7 and the insulating cover sheet 8 may also be generally the same size and shape, for example rectangular, so as to form the primary charging module with the charging surface being large enough to accommodate at least one, and more preferably two or more, devices to be charged. FIGS. 5(a) and (b) also show the structure of the charging module without the cover sheet and without any devices to be charged thereon for the sake of clarity.

As shown in FIG. 4, the primary transformer circuit module transmits electrical energy at high frequency through a flat charging surface that contains the primary transformer windings. The secondary winding is also planar and is located in the portable electronic equipment and couples this energy, and a rectifier within the portable equipment rectifies the high-frequency secondary AC voltage into a DC voltage for charging the battery inside the portable equipment either directly or via a charging circuit. The rectified DC voltage is applied to the battery via mechanical contacts provided in an integrated back cover as will be described further below. No physical electrical connection between the primary charger circuit and the portable electronic equipment is needed.

The primary charger circuit has (1) a switched mode power electronic circuit, (2) the primary side of a planar transformer that consists of a group of primary windings connected in series or in parallel or a combination of both, (3) an EMI shield and (4) a flat interface surface on which one or more portable electronic devices can be placed and charged simultaneously. The schematic of the primary charger system is shown in FIGS. 5(a) and (b) without the insulating cover.

The battery charging system can be powered by AC or DC power sources. If the power supply is the AC mains, the switched mode power electronic circuit should perform a low-frequency (50 or 60 Hz) AC to DC power conversion and then DC to high-frequency (typically in the range from 20 kHz to 10 MHz) AC power conversion. This high-frequency AC voltage will feed the primary planar windings of the primary charger circuit. If the power supply is a battery (e.g., a car battery), the switched mode power supply should perform a DC to high-frequency AC power conversion. The high-frequency voltage is fed to the primary windings of the planar transformer.

Figure 6A:
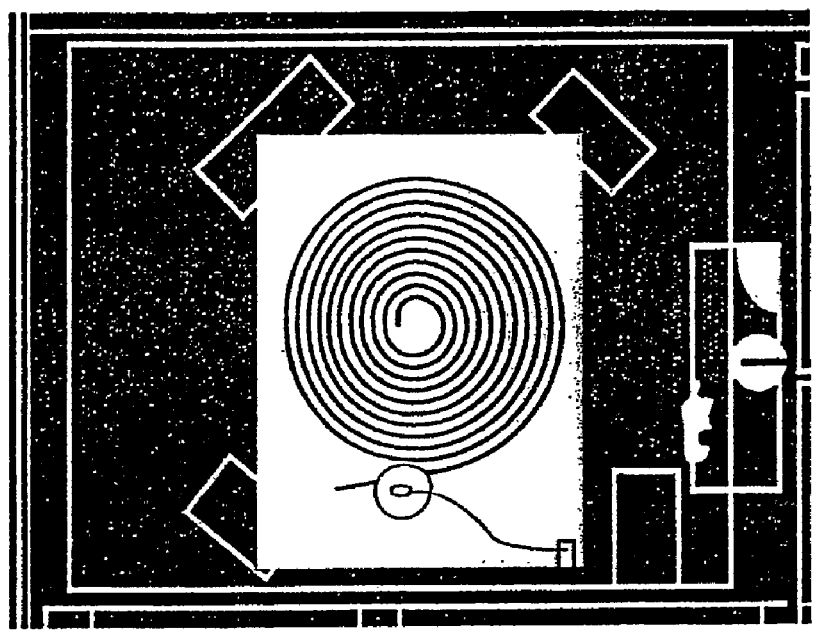
FIGS. 6(a) & (b) show (a) a single spiral PCB winding, and (b) the measured magnetic field distribution of a single spiral winding.
Figure 6B:
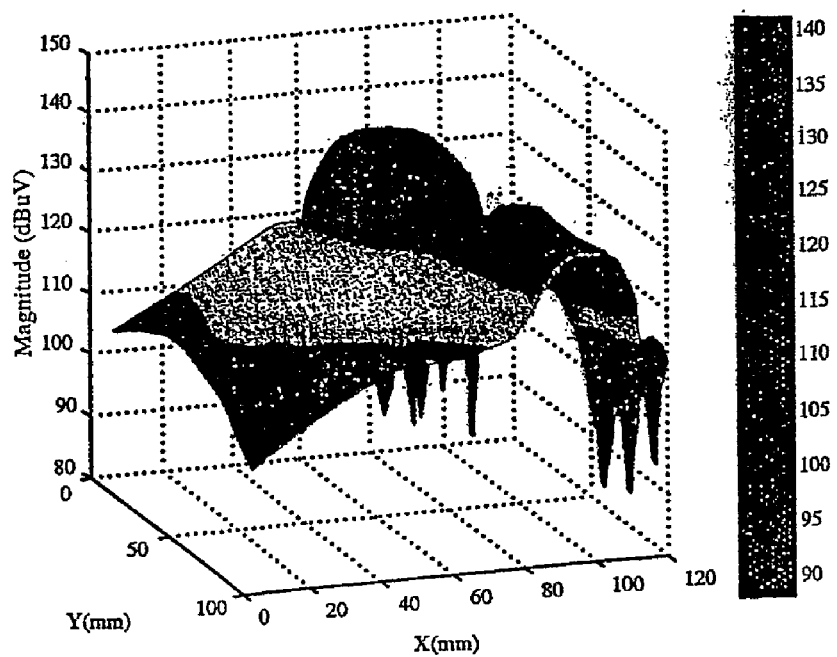

Preferably, the charger should be able to charge one or more than one items of portable electronic equipment at the same time. In order to achieve such a function, the AC magnetic flux experienced by each item of portable equipment placed on the charging surface should be as even as possible. A standard planar spiral winding as shown in FIG. 6(a) is not suitable to meet this requirement because its flux distribution is not uniform as shown in FIG. 6(b) when the winding is excited by an AC power source. The reason for such non-uniform magnetic flux distribution is that the number of turns in the central region of the single spiral winding is largest. As the magnitude of the magnetic flux and the magnetomotive force (mmf) is proportional to the product of the number of turn and the current in the winding, the magnetic flux is highest in the center of the winding.

Figure 7A:
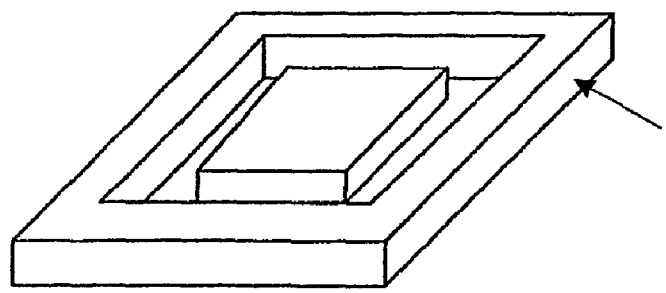
FIGS. 7(a) & (b) illustrate the use of a magnetic core to control magnetic field distribution.
Figure 7B:
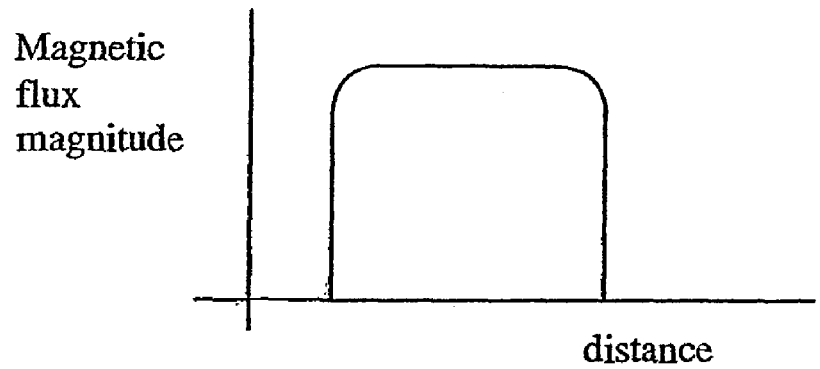

One method to ensure uniform magnetic flux or mmf distribution is to use a concentric primary winding with a planar magnetic core as shown in FIG. 7(a). This magnetic core-based approach allows the magnetic flux to concentrate inside the core and typical magnetic flux distribution is shown in FIG. 7(*b*). In general, the flat charging interface surface of the primary charger should be larger than the total area of the portable electronic equipment.

Figure 8:
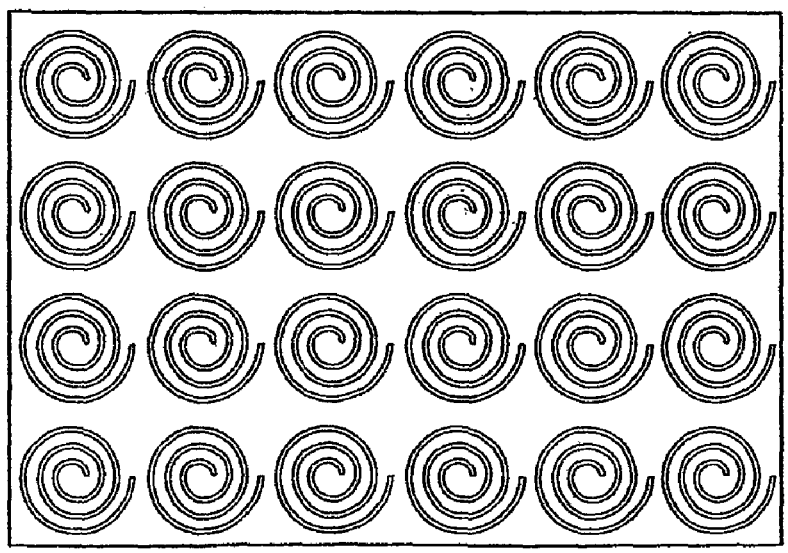
FIG. 8 shows an embodiment of the invention in which a plurality of primary windings are arranged in an array structure.

In order to ensure that more than one item of portable electronic equipment can be placed on the flat charging surface and charged simultaneously, a second and more preferred method proposed is to ensure that the magnetic flux distribution experienced by each items of portable electronic equipment is as uniform as possible. This method can be realized by using a "distributed" primary planar transformer winding array structure as shown in FIG. 8. This planar winding array consists of many printed spiral windings formed on the PCB. These printed spiral windings can be hexagonal, circular, square or rectangular spirals, and can be connected in series, in parallel or a combination of both to the high-frequency AC voltage generated in the power supply in the primary charger circuit. The array comprises relatively closely spaced coils so as to be able to generate the required near-uniform magnetic flux distribution, as an array of widely spaced apart coils may not generate such a near-uniform field.

Figure 9A:
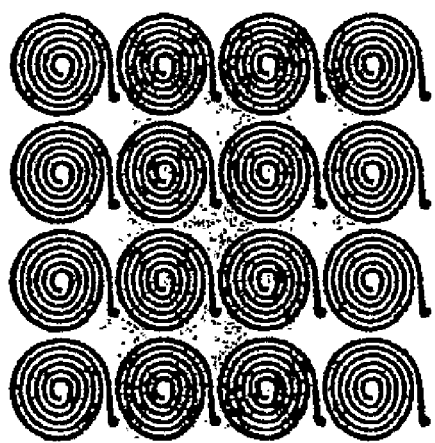
FIGS. 9(a) & (b) shows (a) a 4×4 primary winding array, and (b) the resulting magnetic field distribution.
Figure 9B:
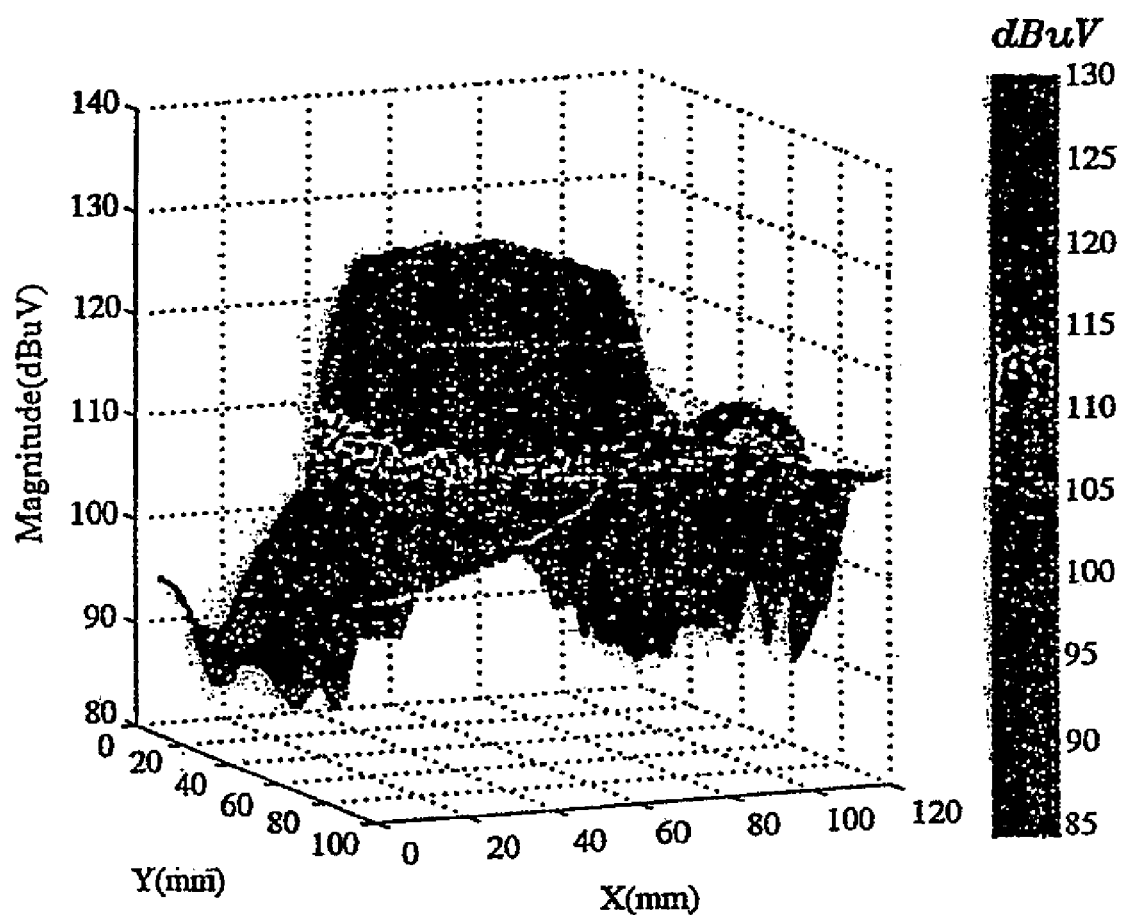

FIG. 9(*a*) shows a practical example with the transformer winding array connected in series so that all the fluxes created in the windings point to the same direction. FIG. 9(*b*) show the measured flux distribution of one planar transformer when the windings in the transformer array are connected in series. This measurement confirms the near uniform magnetic flux distribution of the array structure. Comparison of FIG. 6(*b*) and FIG. 9(*b*) confirms the improvement of the uniform magnetic field distribution using the transformer array structure. In addition, this transformer array structure provides for the possibility of multiple primary transformer windings being provided for localized charging as will now be explained.

Figure 10A:
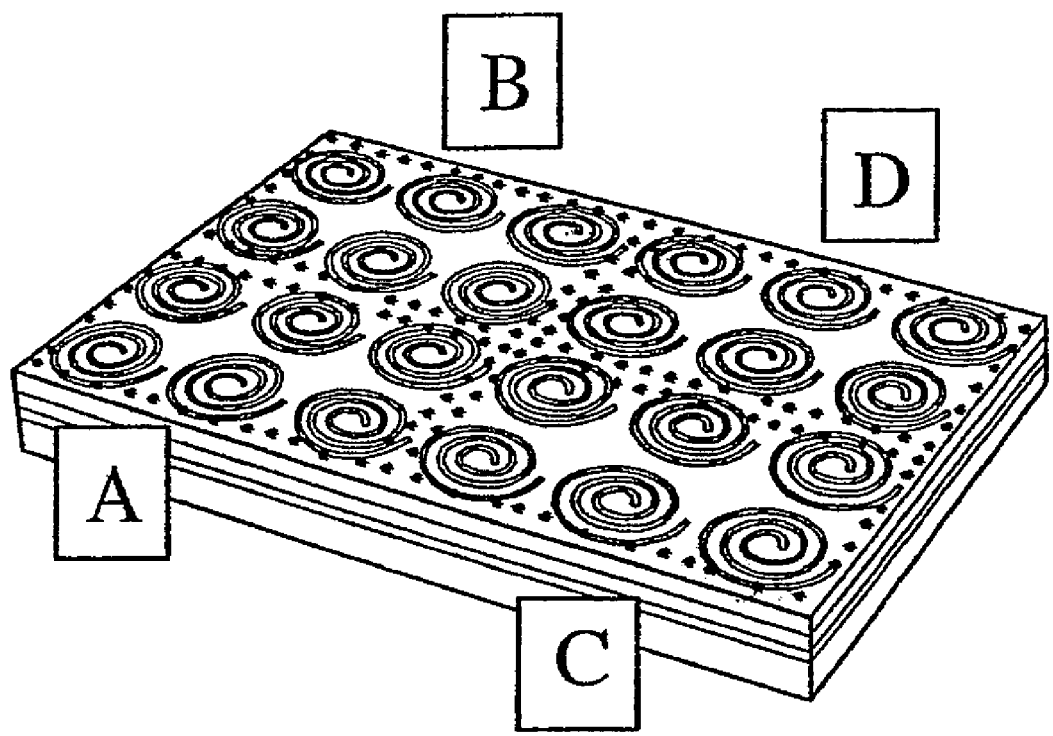
FIGS. 10(a)-(c) illustrate an embodiment of the invention in which primary windings are arranged in groups with FIG. 10(c) showing the equivalent circuit.
Figure 10B:
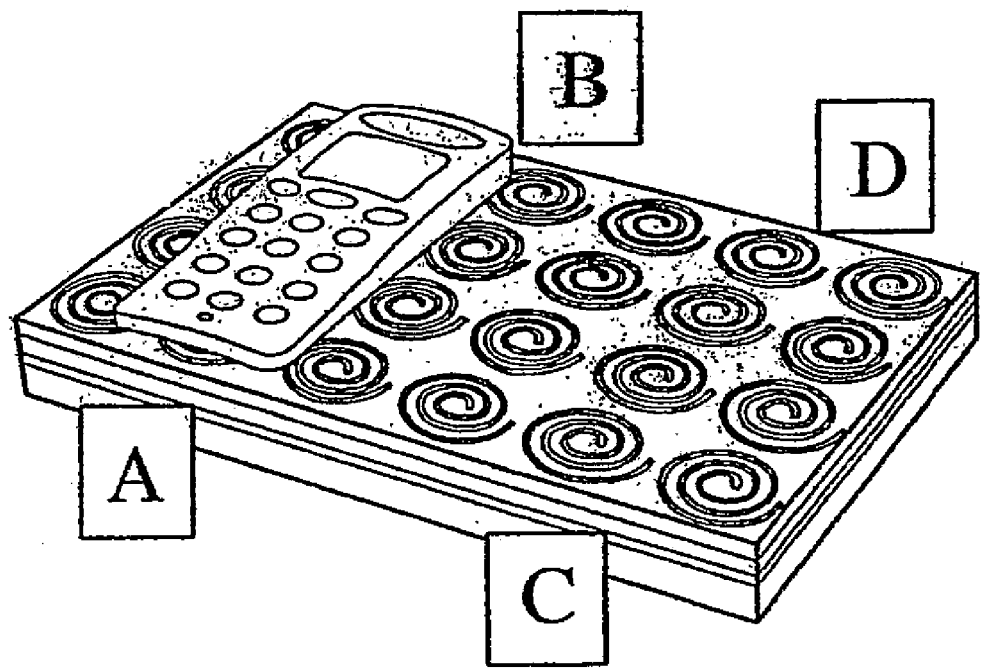
Figure 10C:
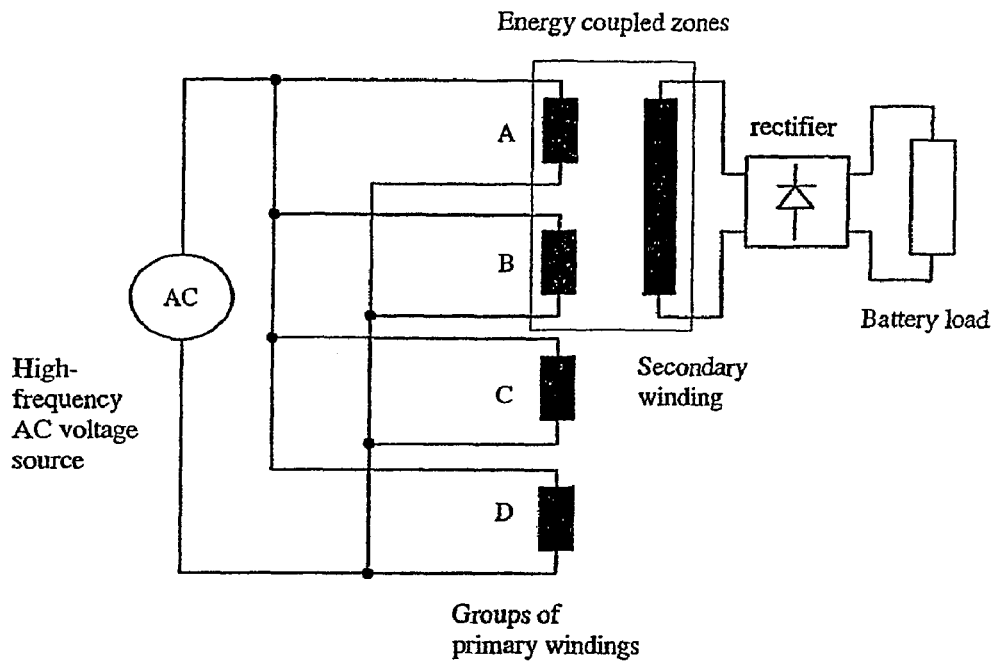
Figure 11:
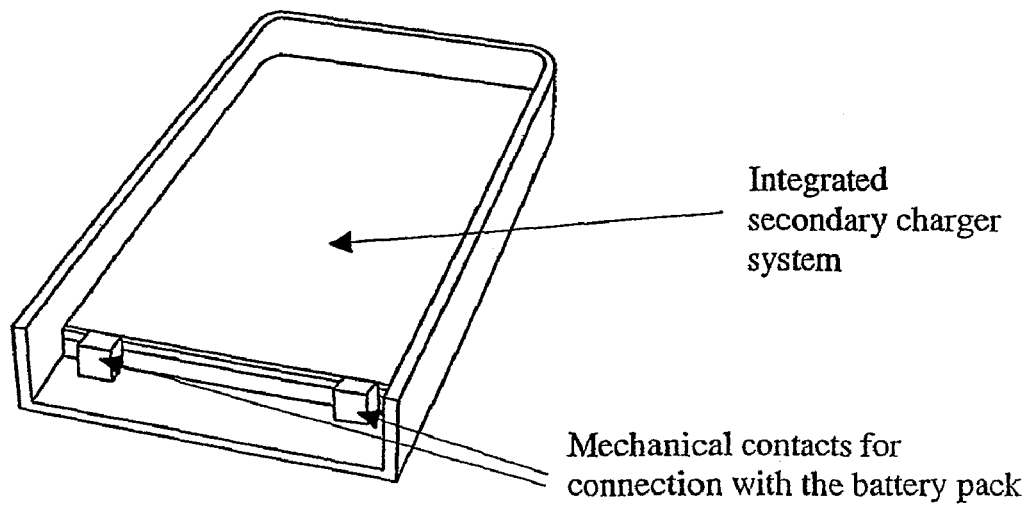
FIG. 11 shows an example of the back cover of an electronic device designed to be recharged using an embodiment of the present invention.
Figure 12A:
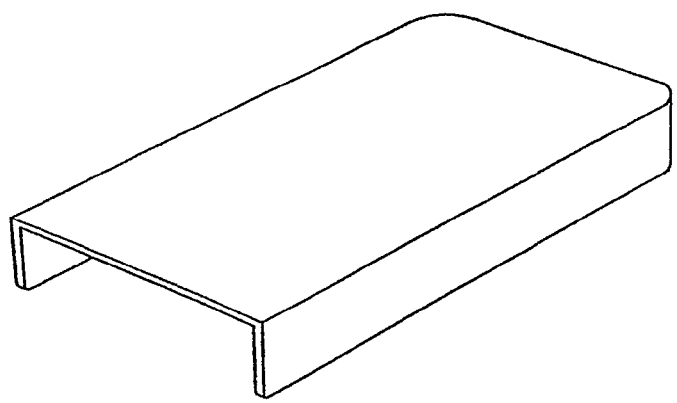
FIGS. 12(a)-(d) show exploded views of the back cover of FIG. 11.
Figure 12B:
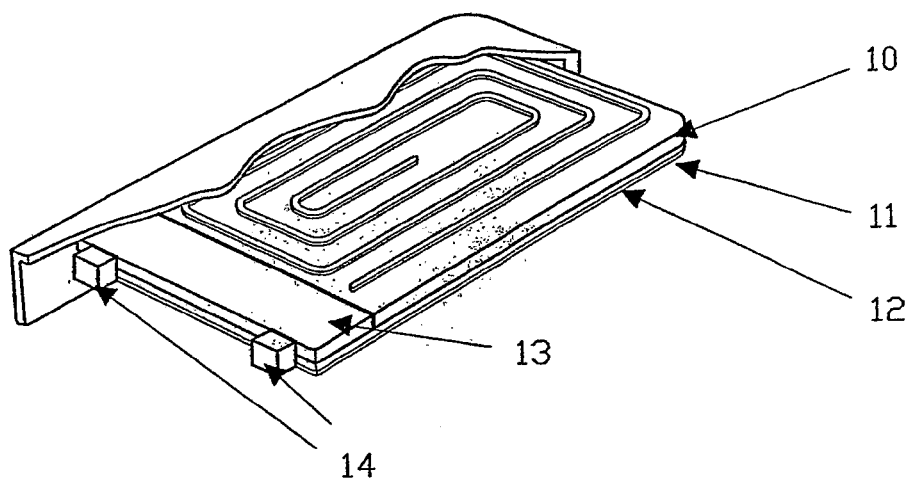
Figure 12C:
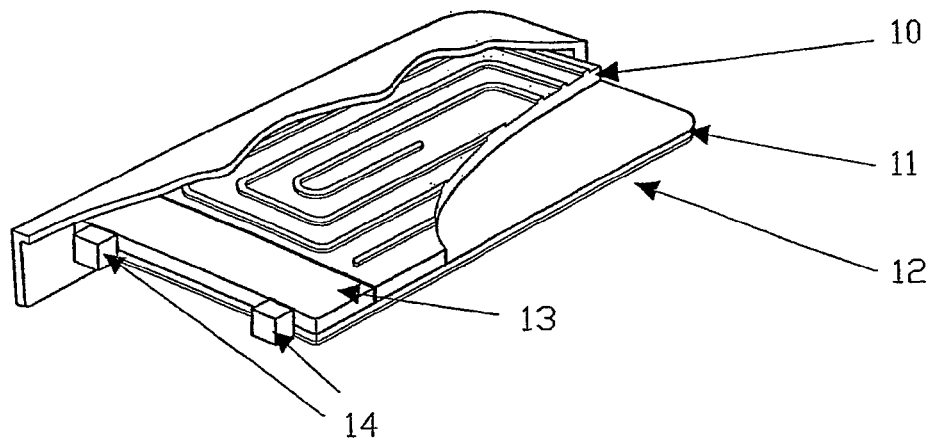
Figure 12D:
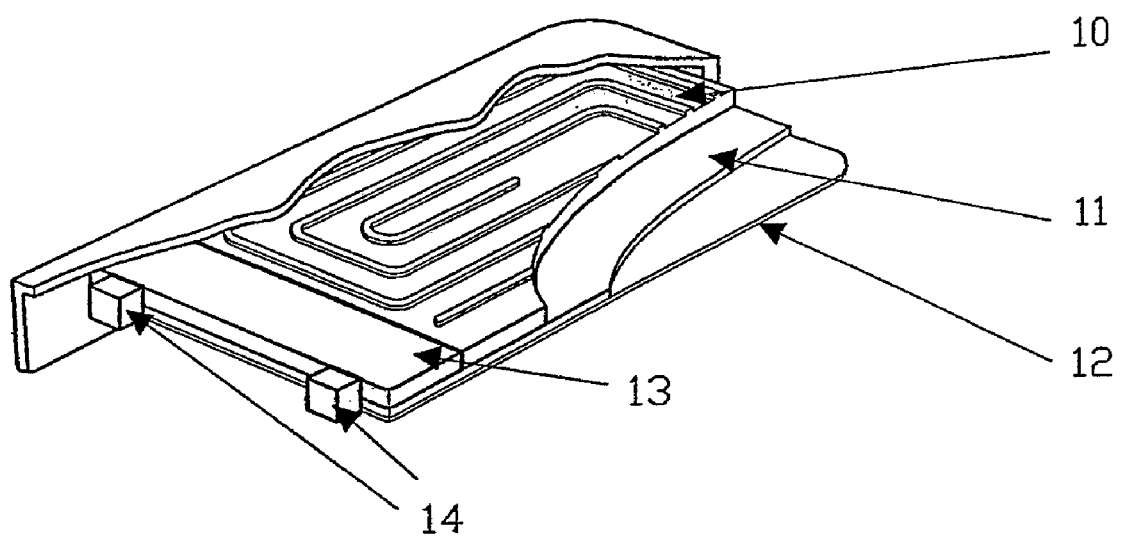

The primary transformer windings can also take the form of a combination of series and parallel connections if desired. Such an arrangement allows the charging surface to be divided into various charging regions to cater for different sizes of the secondary windings inside the portable electronic equipment. FIG. 10(*a*) illustrates this localized charging zone principle. Assume that the transformer array is divided into 4 zones (A, B, C, and D). The transformer windings within each zone are connected in series to form one primary winding group with the distributed magnetic flux feature. There will be four primary windings in the equivalent circuit as shown in FIG. 10(*c*). If the portable electronic equipment is placed on Zones A and B as shown in FIG. 10(*b*), the equivalent electrical circuit is shown in FIG. 10(*c*). Only the parallel primary transformer winding groups for Zones A and B are loaded because they can sense a nearby secondary winding circuit in the portable electronic equipment. Therefore, they will generate magnetic flux in Zones A and B. Primary transformer windings C and D are not loaded because they have no secondary transformer circuit close to them and their equivalent secondary circuits are simply an open-circuit (FIG. 10(*c*)). As a result, power transfer between the primary charger circuit and the secondary windings inside the portable electronic equipment takes place basically through the coupled regions (areas) of the charging interface surface covered by the portable electronic equipment. The non-covered area of the charging surface will transfer virtually no energy. This special design avoids unnecessary electromagnetic interference. A further advantage of this localized energy transfer concept, is that it enables a movable device (such as a wireless computer mouse) to be continually charged as it moves over the charging surface. In the case of a wireless computer mouse, for example, the primary charging circuit could be integrated into a mouse pad and the mouse may be charged as it rests on or moves over the mouse pad.

The back cover of the portable electronic equipment is a detachable back cover shown in FIG. 12(*a*) that covers the battery and which may be removed when the battery is replaced. In preferred embodiments of the present invention, this back cover has a built-in secondary planar transformer winding 10, a diode rectifier circuit 13 and preferably a thin EMI shield 11, 12 as shown in FIGS. 12(*b*) and 12(*c*). When the back cover side of the portable equipment is placed near the flat charging surface of the primary charger circuit, this secondary winding couples the energy from the nearby primary transformer winding or windings. The rectifier circuit rectifies the coupled AC voltage into a DC voltage for charging the battery through mechanical contacts 14. This rectifier circuit also prevents the battery from discharging into the secondary winding. In order to avoid induced circuit from circulating in other metal parts inside portable electronic circuit, it is preferable to include a thin EMI shield as part of the integrated back cover structure as shown in FIG. 12. This EMI shield can be a thin piece of ferrite material (such as a flexible ferrite sheet developed by Siemens) or ferrite sheets, or more preferably a combination of a ferrite sheet 11 and then a thin sheet 12 of copper of another conductive material such as aluminum.

It will thus be seen that, at least in its preferred forms, the present invention provides a new planar inductive battery charger for portable electronic equipment such as mobile phones, handheld computers, personal data assistant (PDA) and electronic watches, and wireless computer mice. The inductive charger system consists of two modules, including (1) a power delivering charger circuit that contains the primary circuit of a planar isolation transformer and a flat charging surface and (2) a separate secondary transformer circuit that consists of a printed winding, a rectifier and preferably a thin EMI shield and which is located in the portable electronic equipment to be charged.

An advantage of the present invention, at least in preferred forms, is that the primary charger circuit system has the primary side of a planar transformer and a flat interface surface on which one or more portable electronic devices can be placed and charged simultaneously. The secondary circuit can be integrated into the back cover of the portable electronic device or separately placed inside the electronic device. The invention also extends to a back cover design with an in-built secondary circuit for the portable equipment. The secondary winding of the planar transformer can be EMI shielded and integrated into the back cover adjacent to the battery in the portable electronic device. As long as the back cover sides of the portable electronic device are placed on the charger surface, one or more portable electronic devices can be charged simultaneously, regardless of their orientations.

Figure 13A:
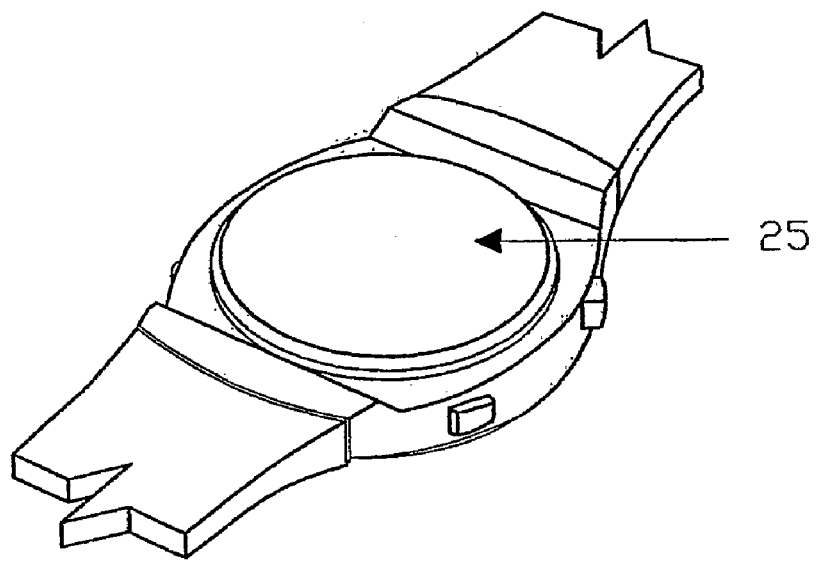
FIGS. 13(a) & (b) show views of a watch that may be recharged in accordance with an embodiment of the invention.
Figure 13B:
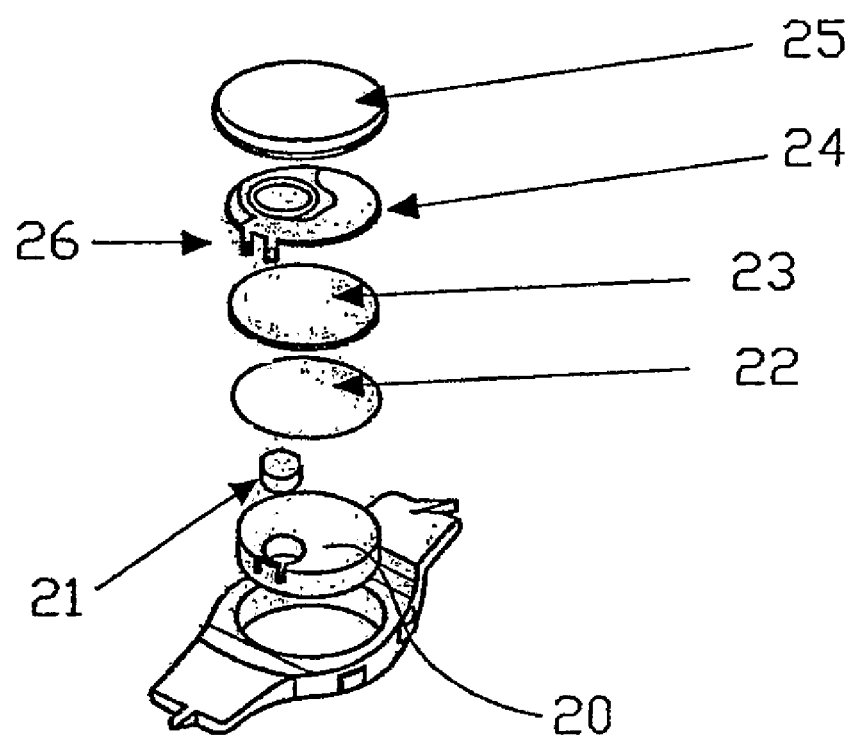

FIGS. 13(*a*) and (*b*) show how an embodiment of the invention may be used to recharge a watch battery. A watch is formed with a basic watch mechanism 20, which is powered by a rechargeable battery 21. The watch mechanism is shielded from electrical interference in the charging process by an EMI shield consisting of, for example, a copper sheet 22 and a ferrite sheet 23 (with the copper sheet closer to the watch mechanism than the ferrite sheet). The other side of the EMI shield is provided a planar coreless transformer secondary winding 24 formed with electrical contacts 26 for connection to the battery 21 and with a rectifier circuit to prevent discharge of the battery. Finally, the watch structure is completed by the provision of a planar back cover 25 formed of non-metallic material. It will be understood that the watch battery may be recharged by placing the watch on the charging surface of a battery charging system as described in the above embodiments such that the back cover 25 lies flat on the planar charging surface. Electrical energy is then coupled from the primary winding(s) in the battery charging module to the secondary winding in the watch and then to the rechargeable battery.

Figure 5B:
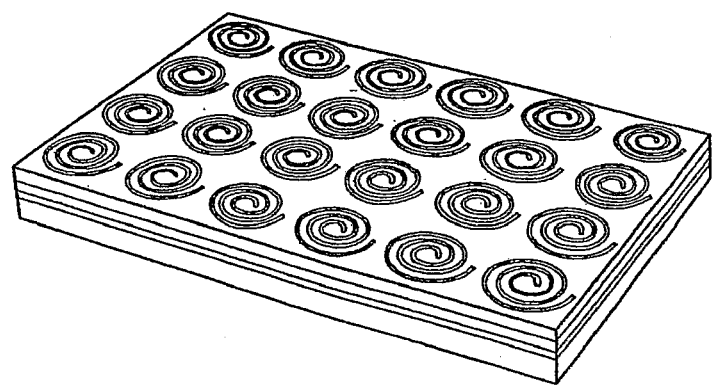
Figure 14:
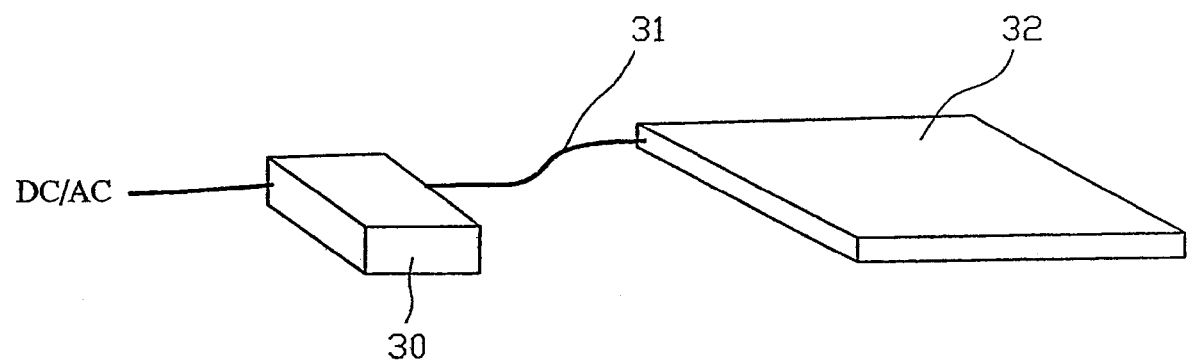
FIG. 14 shows a charging module in accordance with an alternative embodiment of the invention.

In the embodiments described above the charging module is formed as a single integral unit (as shown for example in FIGS. 4 and 5). However, in some situations it may be desirable to separate the electronic charging circuit from the planar charging surface. This possibility is shown in FIG. 14 in which the electronic charging circuit 30 is connected by a cable 31 to the charging surface 32. The charging surface 32 includes an insulating top cover, the planar primary windings printed on a PCB, and a bottom EMI shield formed of ferrite and a conductive sheet such as copper. This embodiment has the advantage that the charging surface is relatively thin, and therefore may be useful for example when the device to be charged is a wireless computer mouse because the charging surface can double as a mouse pad as well as a charging surface.

In the embodiments described above a single layer of transformer arrays is provided. However, in order to generate a more uniform magnetic field distribution, multi-layer transformer arrays can be used. The following embodiments describe how multiple layers of transformer arrays may be used that can provide a very uniform magnetic field distribution on the charging surface.

Figure 15:
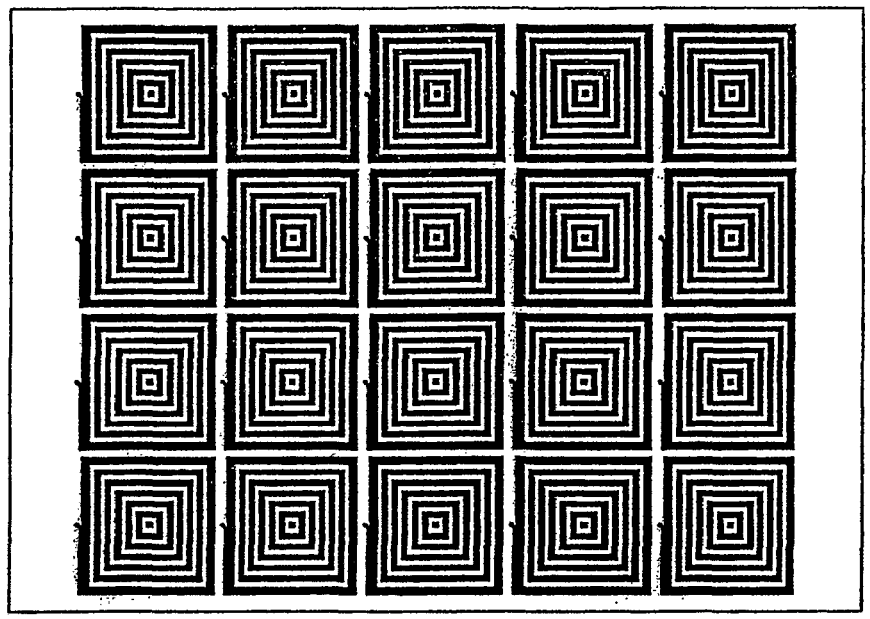
FIG. 15 shows a first layer of a 4×5 winding array for use in a multi-layer embodiment.

FIG. 15 shows a 4×5 primary planar transformer winding array which consists of square-spiral winding patterns. This can be fabricated on one layer of the printed circuit board structure. It should be noted that, for an individual winding pattern in the array, the magnitude of the magnetic flux is highest in the center of the spiral winding. The magnitude of the magnetic flux is smallest in the small gap between adjacent winding patterns.

Figure 16:
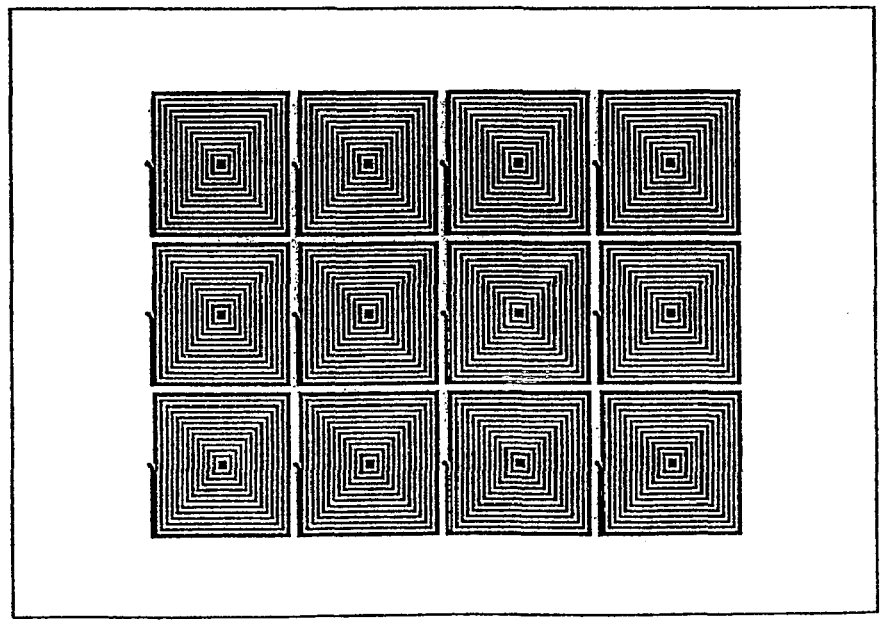
FIG. 16 shows a second layer of a 3×4 winding array for use in conjunction with the layer of FIG. 15 in a multi-layer embodiment.
Figure 17:
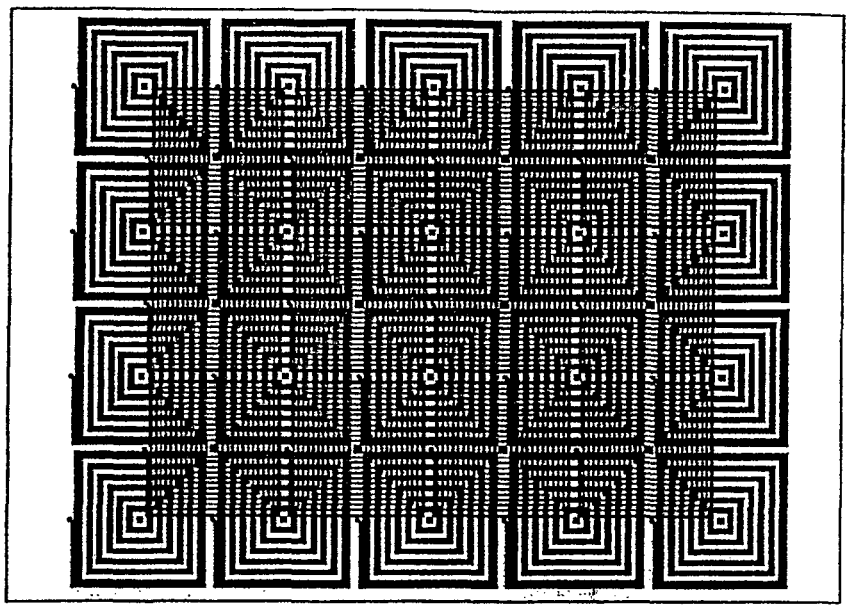
FIG. 17 shows the layers of FIG. 15 and FIG. 16 in the two-layer structure.

A second layer with a 3×4 transformer winding array is shown in FIG. 16. The individual winding patterns in both layers are identical. As shown in FIG. 17, by having the two layers of arrays arranged in such a manner that the center (region of maximum magnetic flux magnitude) of a winding pattern on one layer is placed on the gap (region of minimum magnetic flux magnitude) between adjacent winding patterns on the other layer, the variation of the magnetic field magnitude can be minimized and the magnetic flux magnitude can therefore be made as even as possible over the overlapped surface. The essence of the multi-layer transformer arrays is to have a displacement between the individual winding patterns of the two layers so that the regions of the maximum magnetic field magnitude of one layer are superimposed on the regions of the minimum magnetic field magnitude of the other layer.

Figure 18:
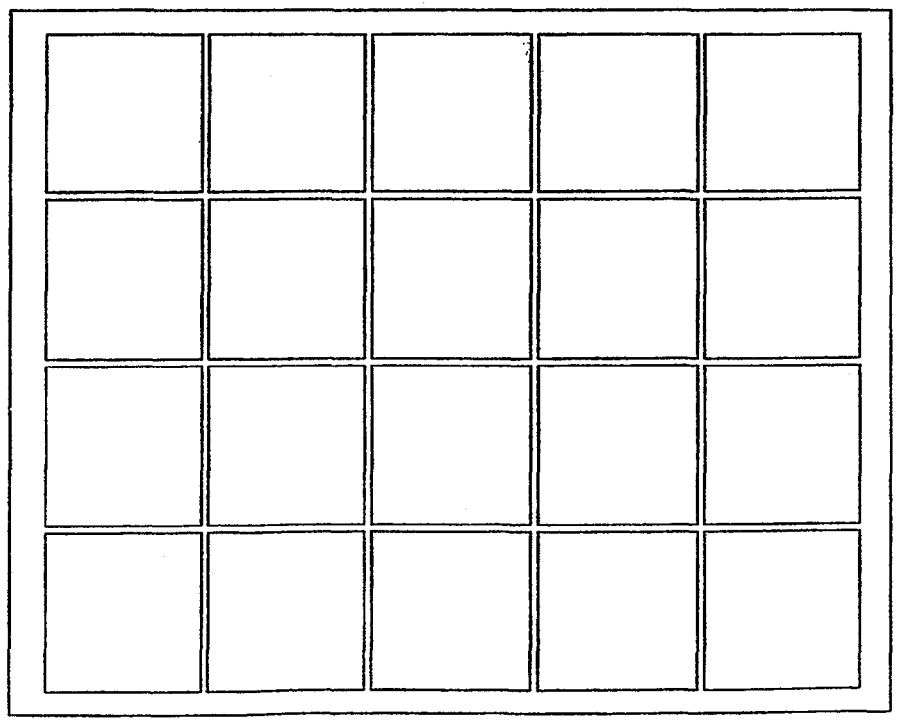
FIG. 18 is simplified version of FIG. 15.
Figure 19:
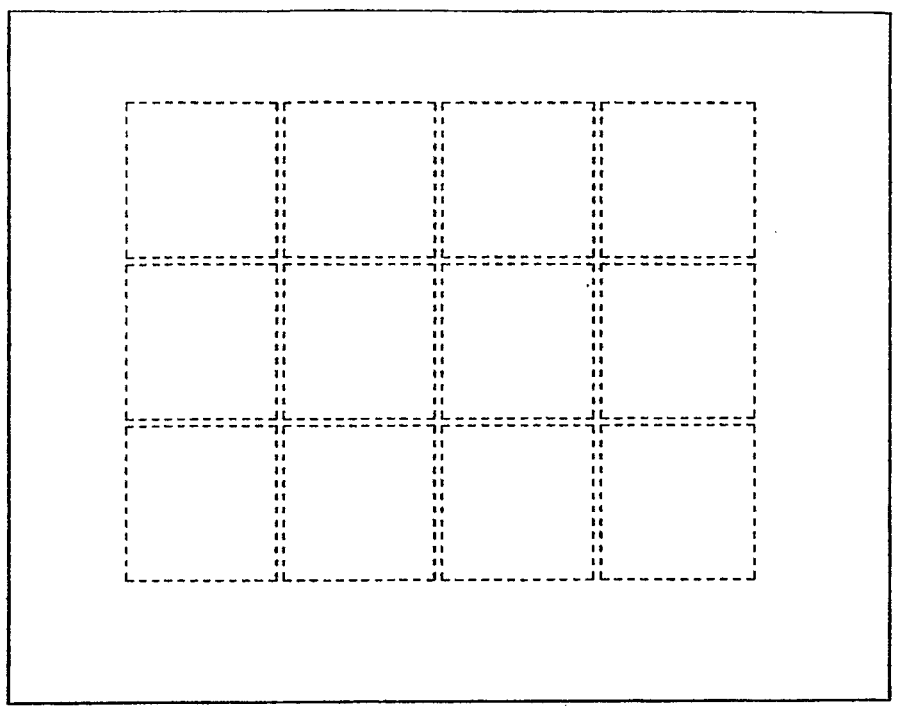
FIG. 19 is a simplified version of FIG. 16.
Figure 20:
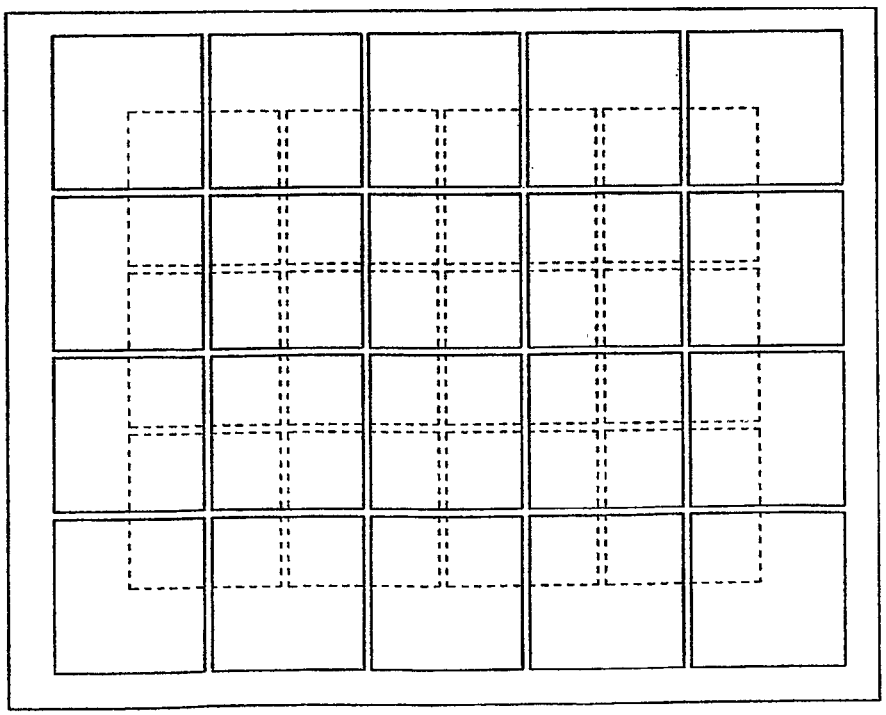
FIG. 20 is a simplified version of FIG. 17.
Figure 21:
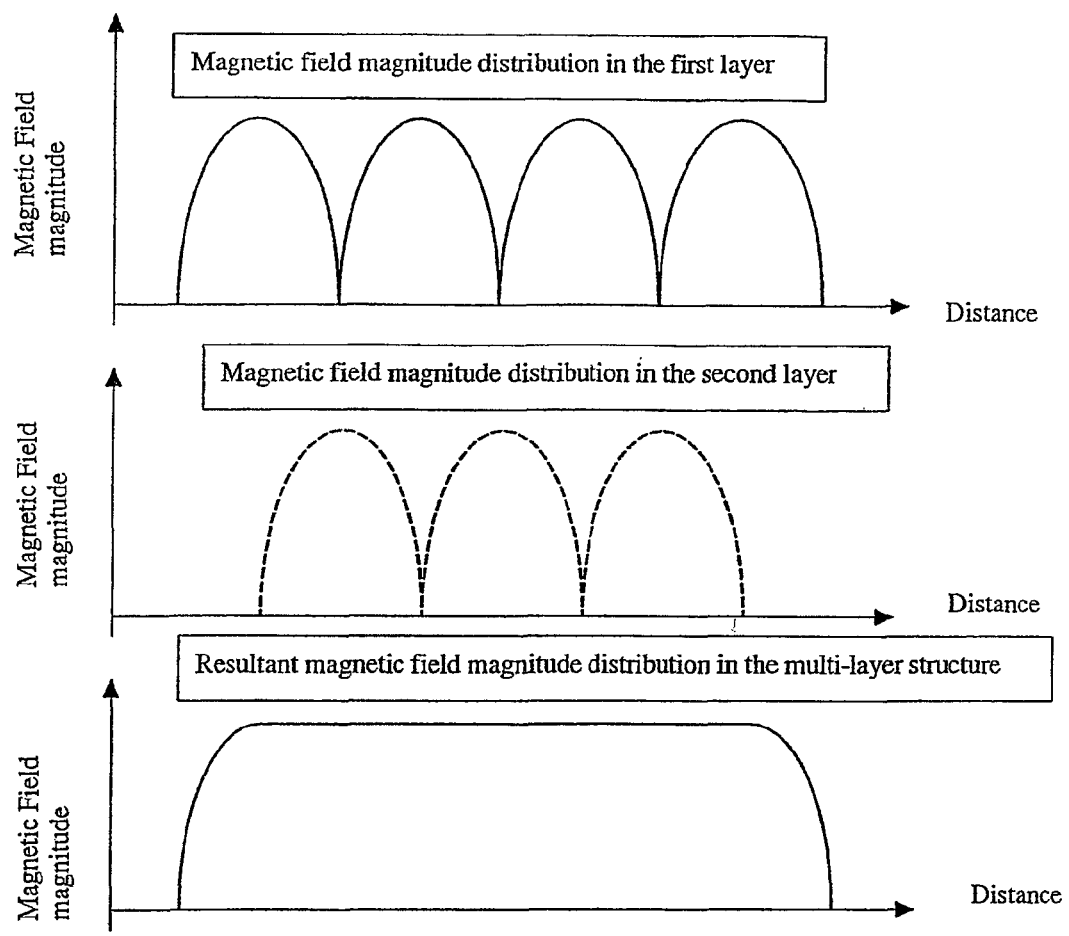
FIG. 21 is a plot showing the smoothing effect of the two-layer structure.

In order to examine the 'uniform magnetic field magnitude' feature of the proposed overlapped multi-layer transformer arrays, this 'magnitude smoothing' concept is illustrated in simplified diagrams in FIG. 18 to 20. FIG. 18 is a simplified version of FIG. 15. Each solid square in FIG. 18 represents a square-spiral winding pattern in the first layer (FIG. 15). FIG. 19 is a simplified version of the FIG. 16. Each dotted square represents a square-spiral winding pattern in the second layer (FIG. 16). The simplified version of the multi-layer array structure is shown in FIG. 20. From FIG. 20, it can be seen that the overlapped array structure (with correct displacement between the two layers) divides each square-spiral winding pattern into four smaller sub-regions. The important feature is that the four sub-regions are identical in terms of winding structure. Despite that fact that the distribution of the magnetic field magnitude on the surface of each individual square-spiral winding is not uniform, the distribution of the resultant magnitude field magnitude on the surface of each sub-region is more or less identical because of the overlapped multi-layer winding structure. The concept of the generating uniform magnetic field magnitude over the charging surface is illustrated in FIG. 21.

In this example, a multi-layer transformer winding array structure that can provide a uniform magnetic field magnitude distribution is described. This example is based on square-spiral winding patterns. In principle, winding patterns of other shapes can also be applied as long as the resultant magnetic field magnitude distribution is as uniform as possible.

The use of two layers of transformer arrays can reduce the variation in the magnetic flux over the charging surface. However, there may still be some variations and the use of a three or four layer structure may provide a still more uniform flux distribution as described in the following embodiments.

Figures 22, 23:
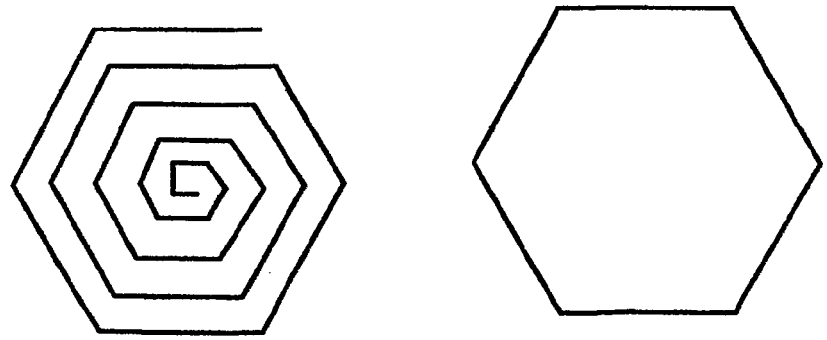
FIG. 22 shows a hexagonal spiral winding.
FIG. 23 is a simplified form of FIG. 22.
Figure 24:
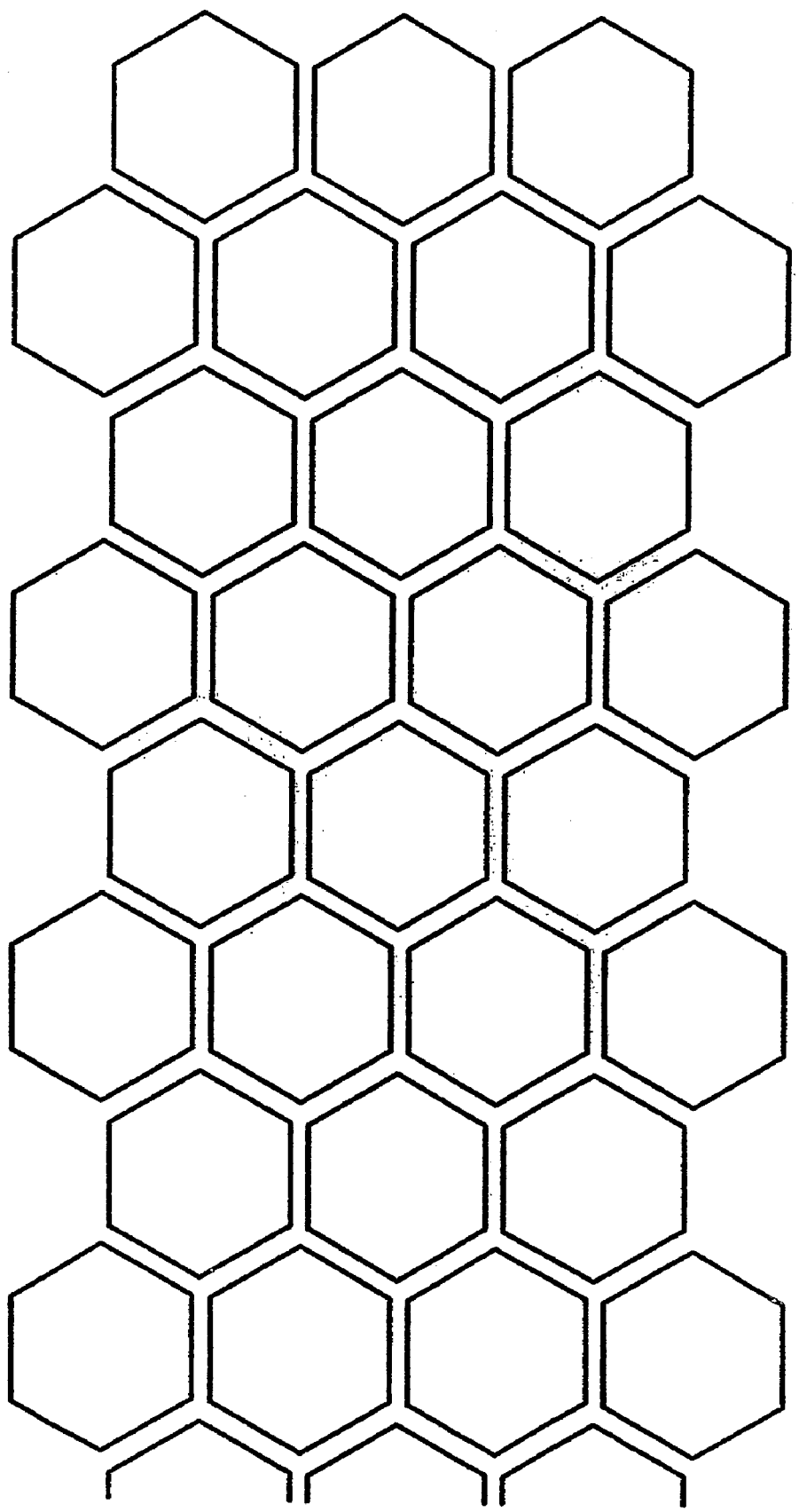
FIG. 24 shows a single-layer of hexagonal spiral windings.
Figure 25:
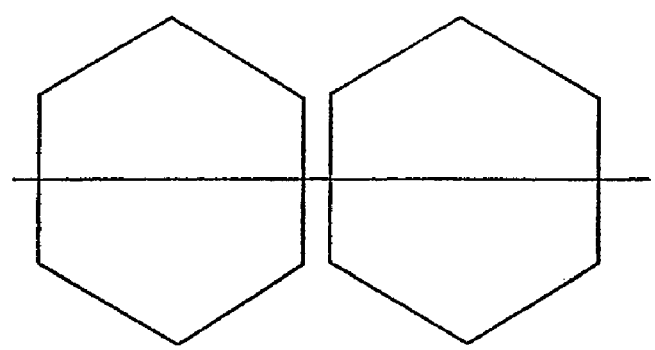
FIG. 25 shows two adjacent hexagonal spiral windings.
Figure 26:
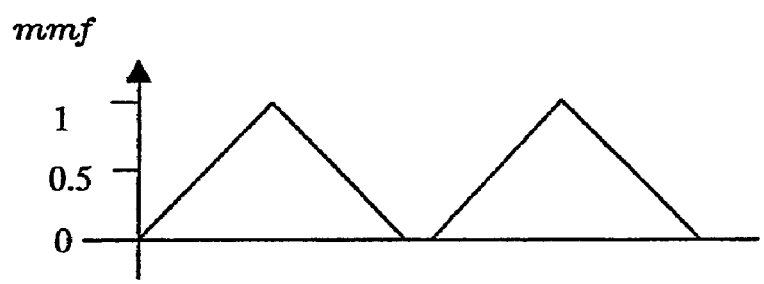
FIG. 26 shows the mmf distribution of the adjacent windings of FIG. 25.

The following embodiment is a structure comprising three layers of planar winding arrays. This PCB winding structure can generate magnetomotive force (mmf) of substantially even magnitude over the charging surface. Each winding array consists of a plurality spiral windings each of which are of an hexagonal shape. A spiral winding arranged in a hexagonal shape is shown in FIG. 22. For simplicity, it will be represented as a hexagon as shown in FIG. 23. A plurality of hexagonal spiral windings can be arranged as an array as shown in FIG. 24. These windings can be connected in parallel, in series or a combination of both to the electronic driving circuit. If a current passes through each spiral winding pattern, a magnetomotive force (mmf), which is equal to the product of the number of turns (N) and current (I) (i.e., NI), is generated. FIG. 25 shows two spiral winding patterns adjacent to each other and the per-unit mmf plot over the distance (dotted line) can be linearized as shown in FIG. 26. It can be seen that the mmf distribution over the distance is not uniform. The maximum mmf occurs in the center of the hexagonal pattern and the minimum mmf occurs in the edge of the pattern.

Figure 27:
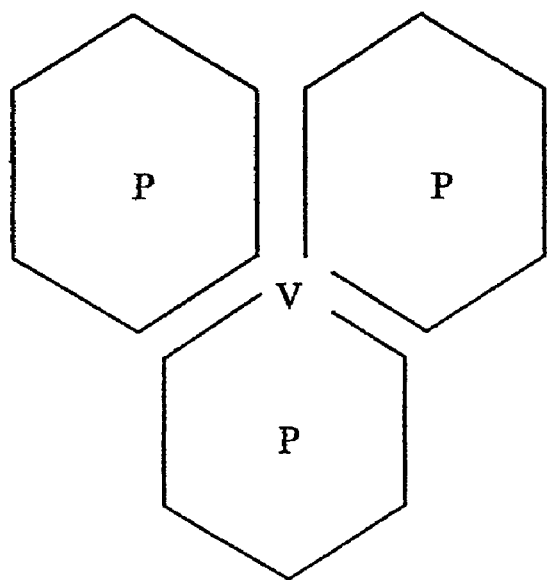
FIG. 27 shows three adjacent hexagonal spiral windings and the peaks and minima of the flux distribution.
Figure 28:
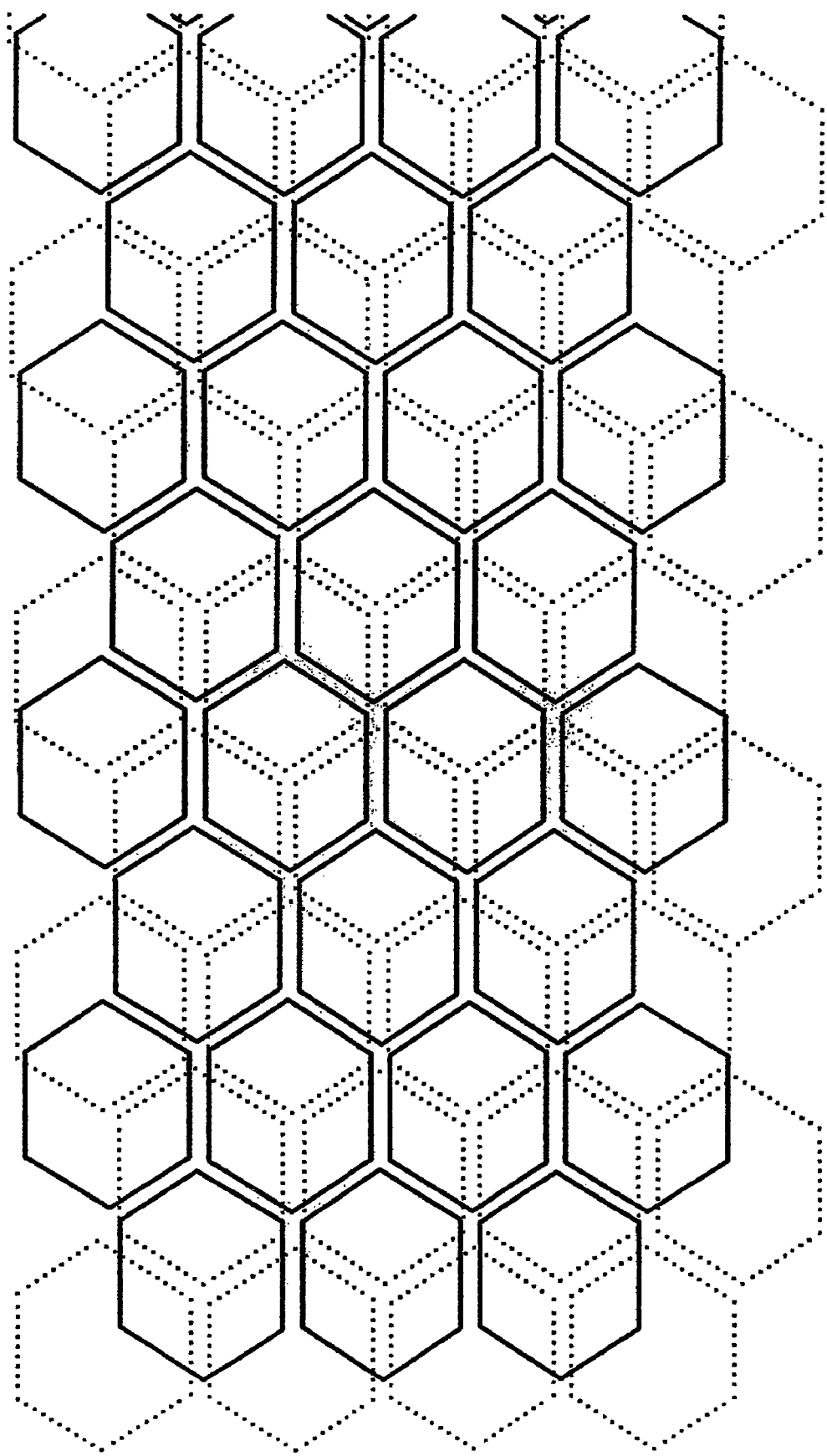
FIG. 28 shows two overlapped layers of hexagonal spiral windings.
Figure 29:
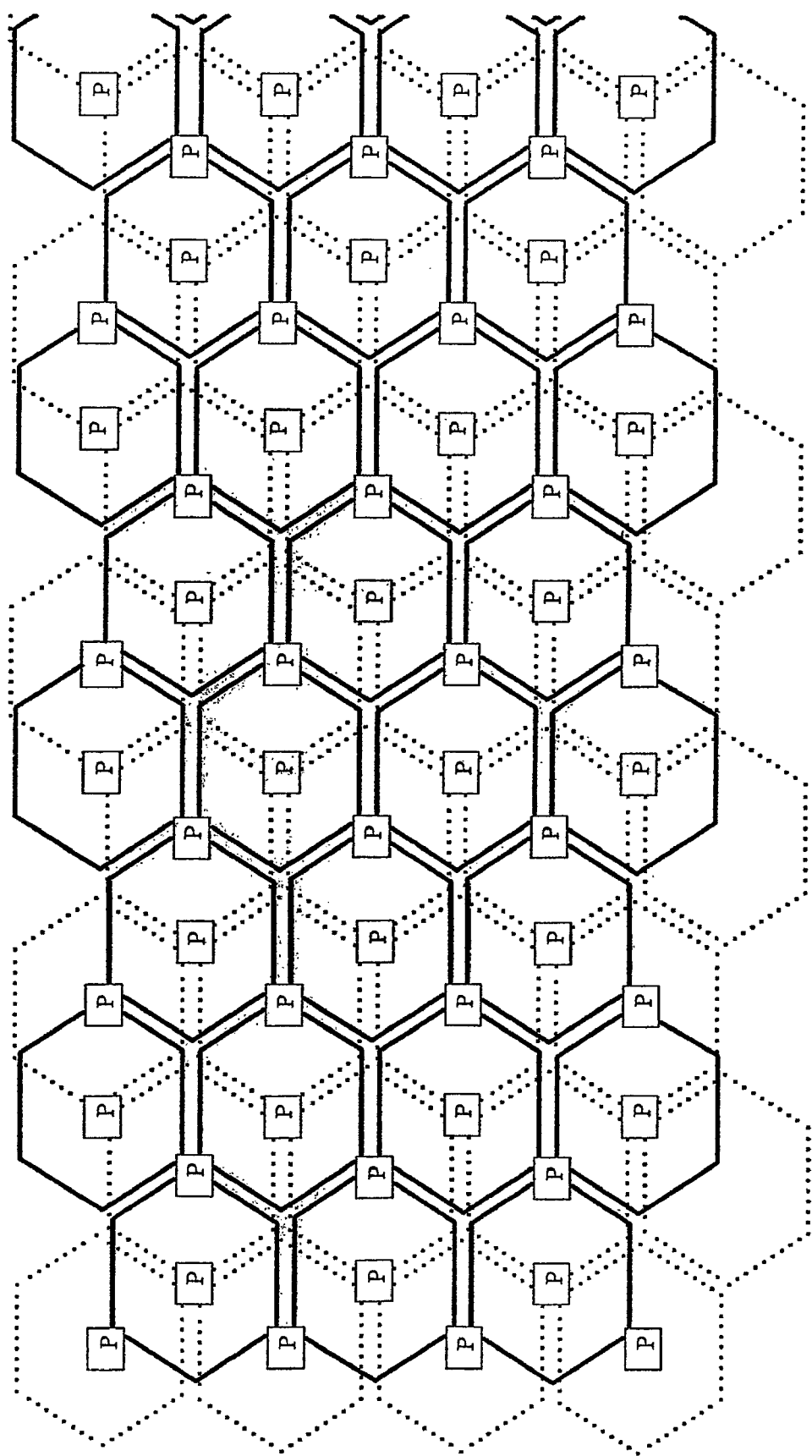
FIG. 29 shows the location of the peak flux in the structure of FIG. 28.

FIG. 27 shows three adjacent windings. The maximum mmf region is labeled by a symbol 'P' (which stands for Peak mmf). The minimum mmf region at the junction of two patterns is labeled as 'V' (which stands for Valley of the mmf distribution). In order to generate a uniform mmf distribution over the planar charging surface, two more layers of PCB winding arrays should be added. This principle is explained firstly by adding a second layer of PCB winding array to the first one as shown in FIG. 28. The second layer is placed on the first one in such a way that the peak mmf positions (P) of the patterns of one layer are placed directly over the valley positions (V) of the patterns in the other layer. FIG. 29 highlights the peak positions of the patterns that are directly over the valley positions of the other layer for the two overlapped PCB layers in FIG. 28.

It can be observed from FIG. 29, however, that the use of two layers of PCB winding arrays, while presenting an improvement over a single layer, does not offer the optimal solution for generating uniform mmf over the inductive charging surface. For each hexagonal pattern in the 2-layer structure, the peak positions occupy the central position and three (out of six) vertices of each hexagon. The remaining three vertices are valley positions (V) that need to be filled by a third layer of PCB winding arrays. These valley positions are shown in FIG. 30 as empty squares.

Figure 30:
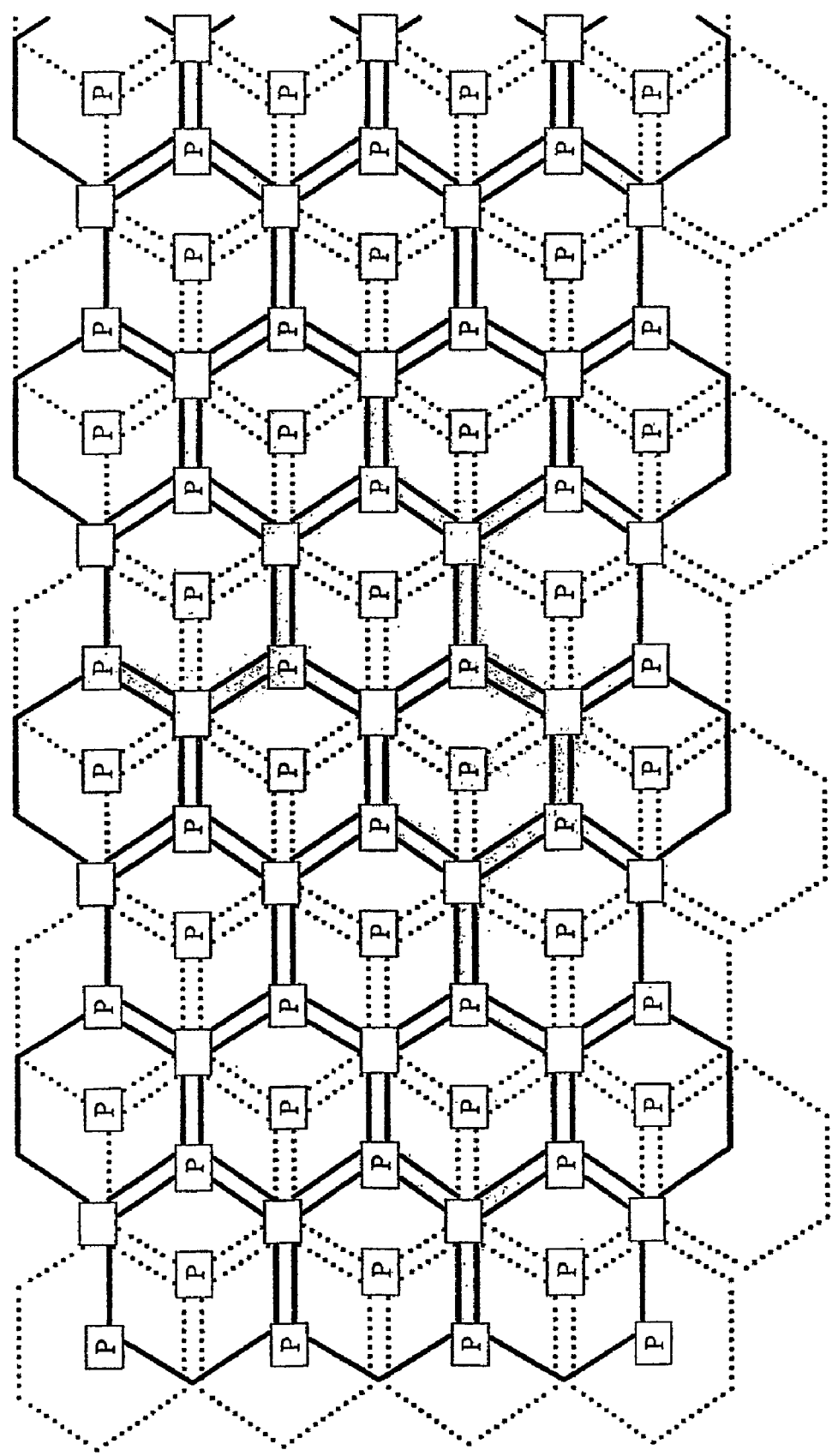
FIG. 30 corresponds to FIG. 29 but also shows the location of the flux minima.
Figure 31:
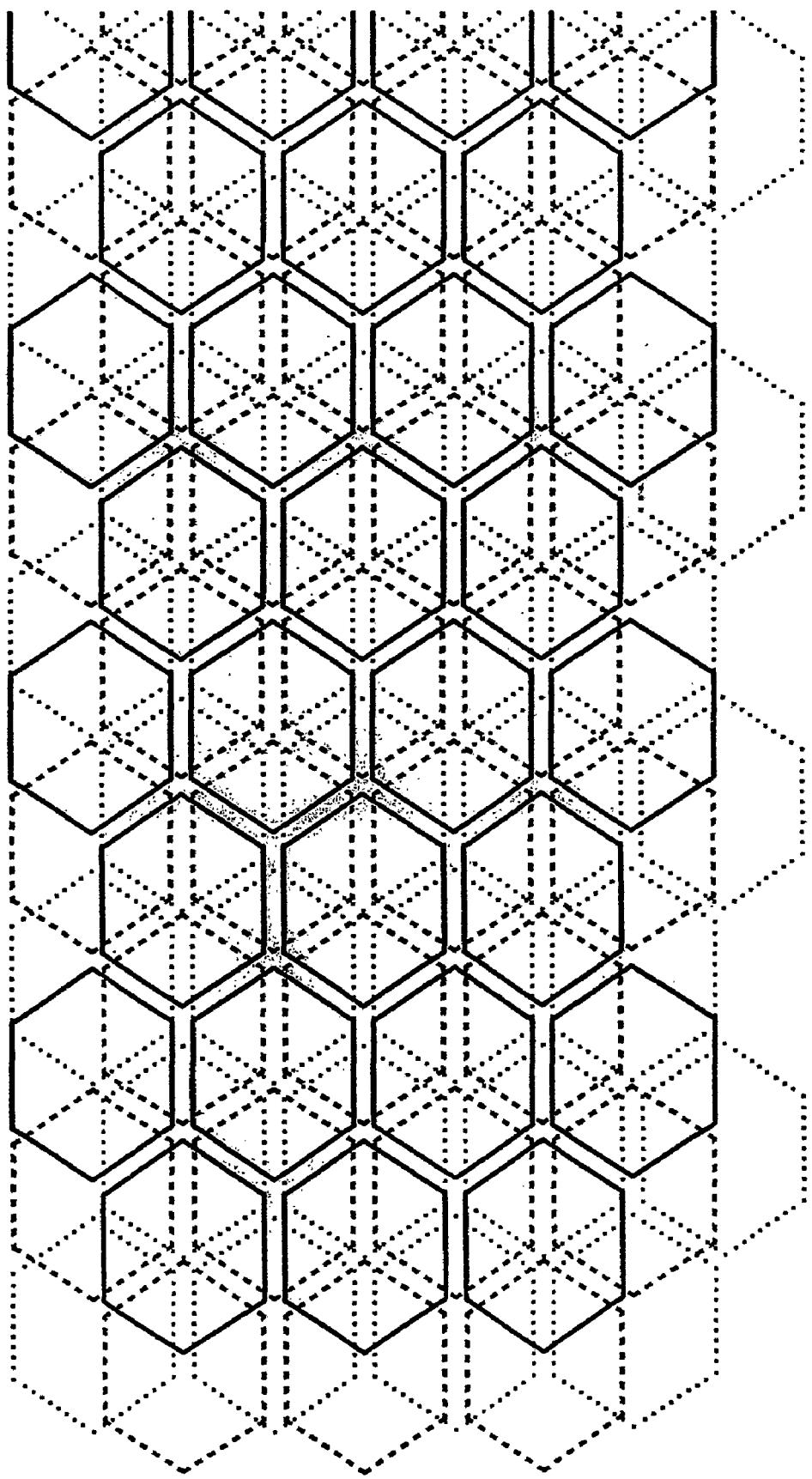
FIG. 31 shows an embodiment of the invention formed with three overlapped layers.
Figure 32:
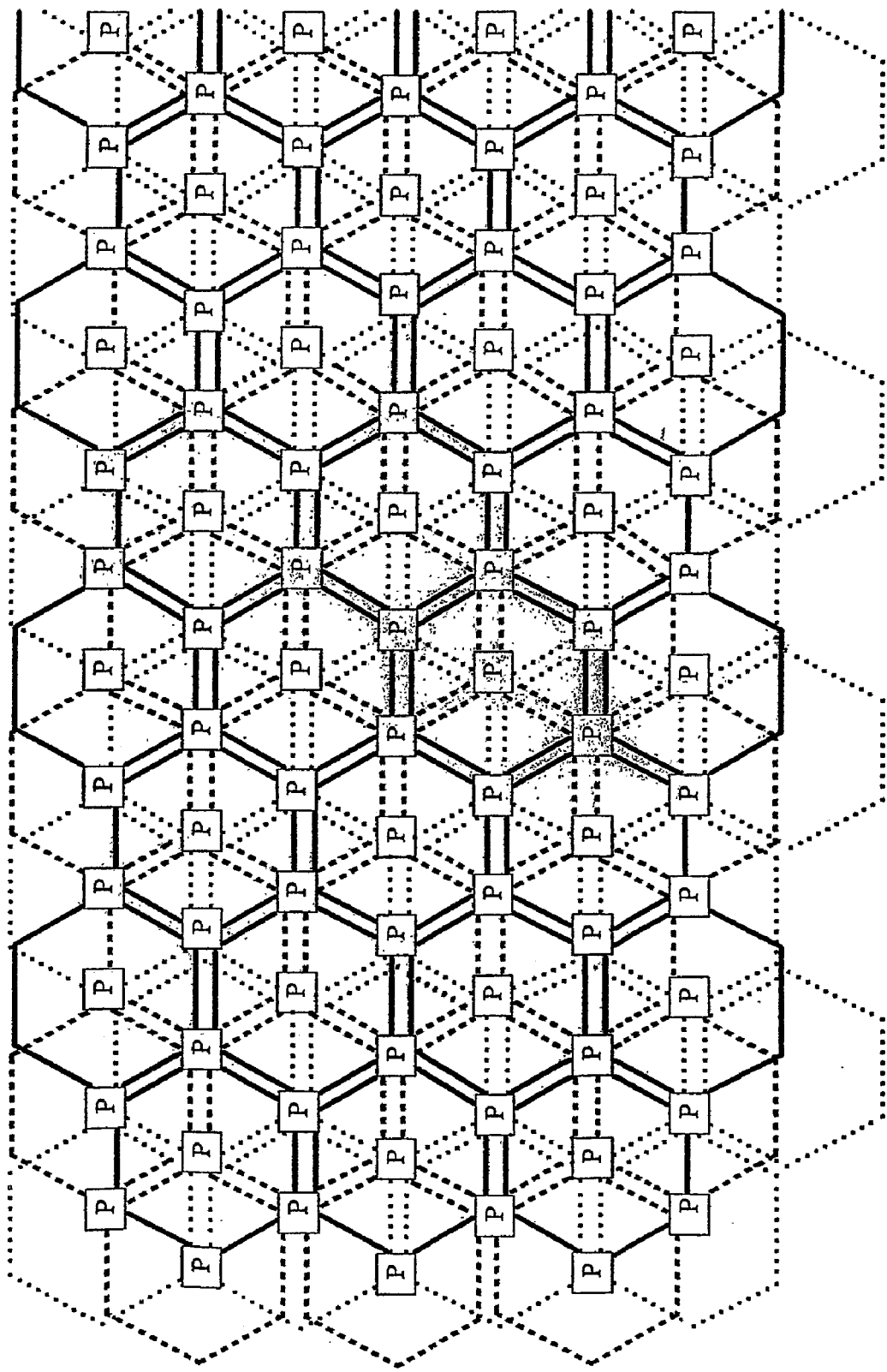
FIG. 32 corresponds to FIG. 31 but shows the location of the flux peaks.

Careful examination of FIG. 30 shows that there are six peak positions (P) surrounding each valley position. Therefore, a third layer of a hexagonal PCB winding array can be used to fill up all these remaining valley positions. By placing the central positions (peak mmf positions) of the hexagonal winding patterns of the third layer of the PCB winding array over the remaining valley positions of the two-layer structure, an optimal three-layer structure is formed as shown in FIG. 31. FIG. 32 highlights the peak mmf positions of the three-layer structure. It can be observed that all central positions and vertices of all hexagonal patterns have peak mmf.

In order to confirm that the mmf over the surface has uniform mmf distribution, any distance between any two adjacent peak mmf positions can be considered as illustrated in FIG. 33. If the winding patterns are excited in the same manner and polarity so that the mmf generated by each layer of the winding array are always in the same direction at any moment, the resultant mmf is simply the sum of the mmf generated by each layer. The dotted line in FIG. 33 shows that the resultant mmf over the distance between any two adjacent peak positions in FIG. 33 is equal to 1.0 per unit. This confirms that the proposed three-layer PCB winding array structure can be used to generate highly uniform mmf over the inductive charging surface. When used as a contactless, inductive charging surface, this uniform mmf distribution feature ensures that, for a given air gap, a secondary PCB coupling winding can always couple the same amount of magnetic flux regardless of the position of the secondary (coupling) PCB on the inductive charging surface. In addition, the voltage induced in the secondary winding would be the same over the inductive charging surface.

In another embodiment, the three-layer PCB winding array structure can be constructed as a four-layer PCB, with one of the four layers accommodating the return paths of the spiral windings to the electronic driving circuit.

A further embodiment is based again on square spiral winding patterns. In this embodiment four layers of square-spiral winding arrays are used to generate highly uniform mmf over the PCB surface. As in the hexagonal embodiment described above, for convenience of illustration each square-spiral winding pattern (FIG. 34) is simplified as a square symbol (FIG. 35) in the following description.

Figure 36:
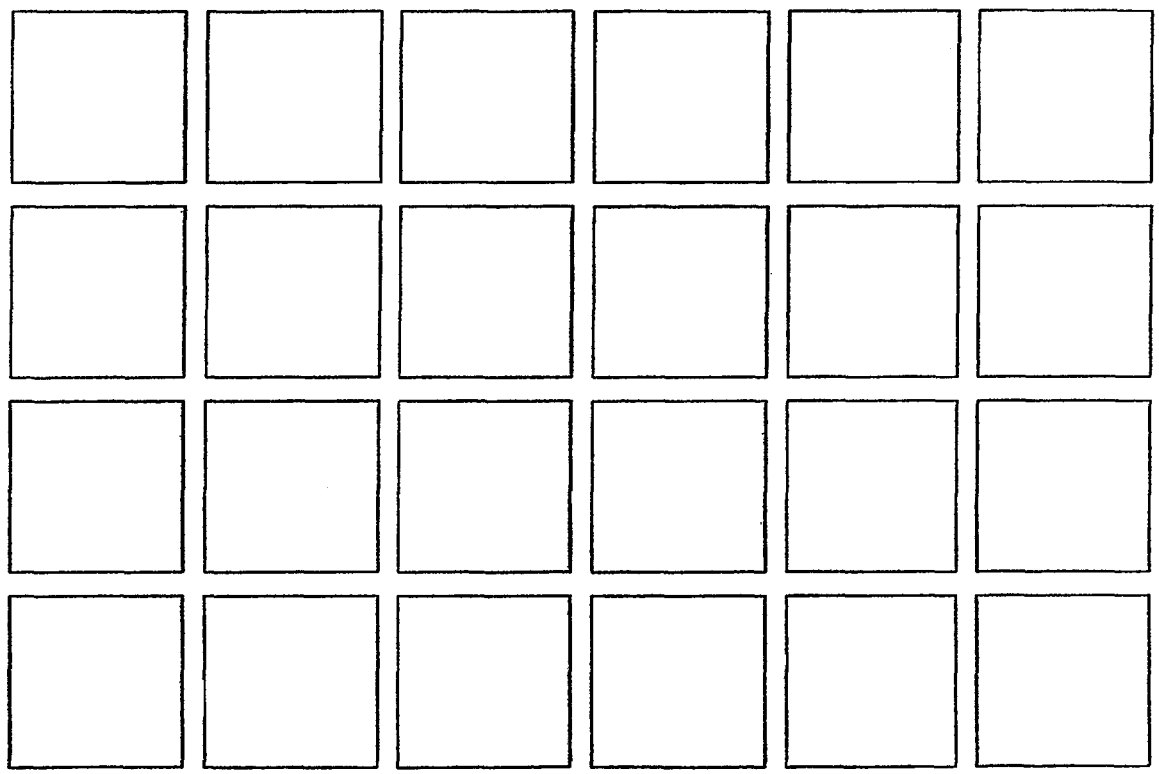
FIG. 36 shows a first layer of square spiral windings.
Figure 37:
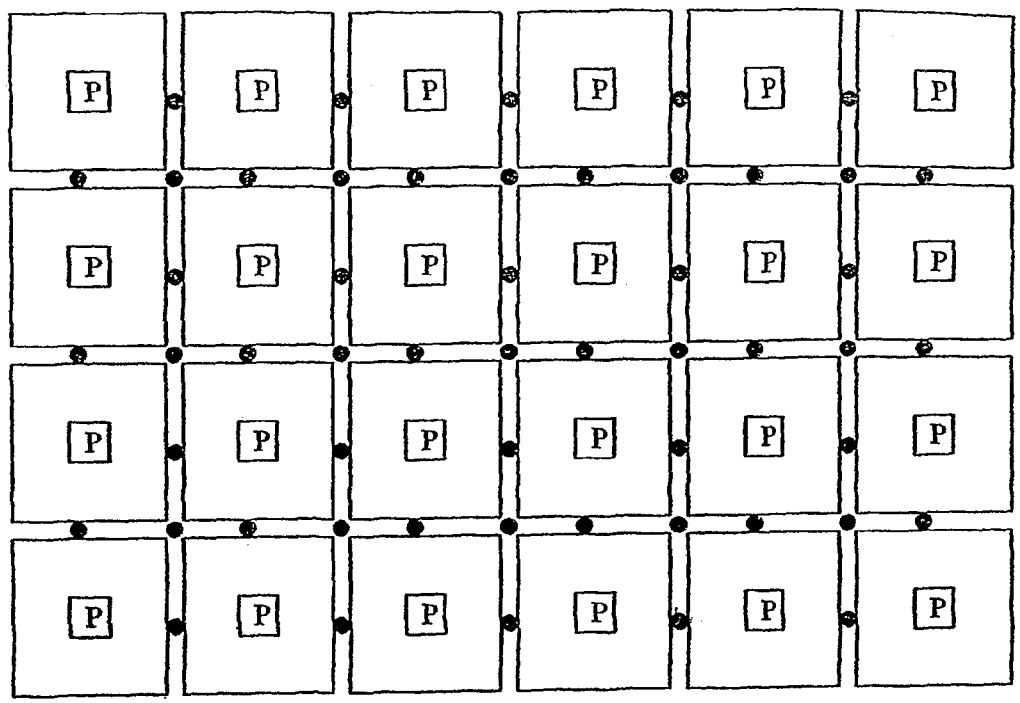
FIG. 37 corresponds to FIG. 36 but shows the location of the flux maxima and minima.

FIG. 36 shows the first layer of the square-spiral PCB winding array. The mmf in the central region of each square pattern is highest. These regions are highlighted as 'Peak' or (P) in FIG. 37. The regions of the minimum mmf (i.e., the valleys) occurs along the edges of the square patterns. These regions are highlighted with dots (•) in FIG. 37.

Figure 38:
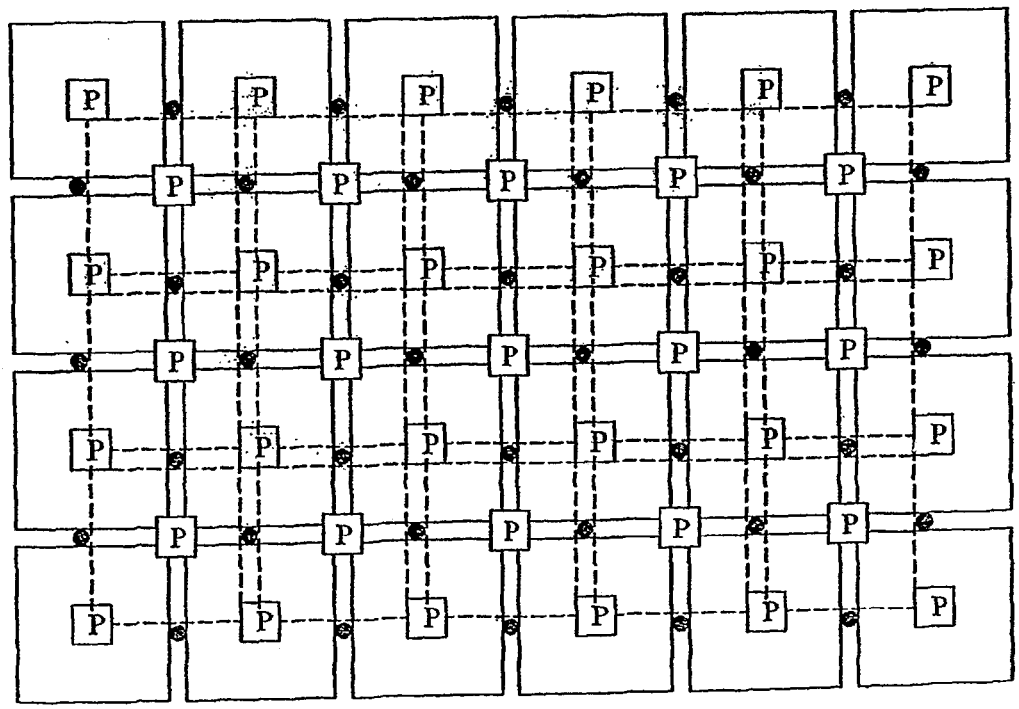
FIG. 38 shows two overlapped layers of square spiral windings including the location of the flux maxima and minima.
Figure 39:
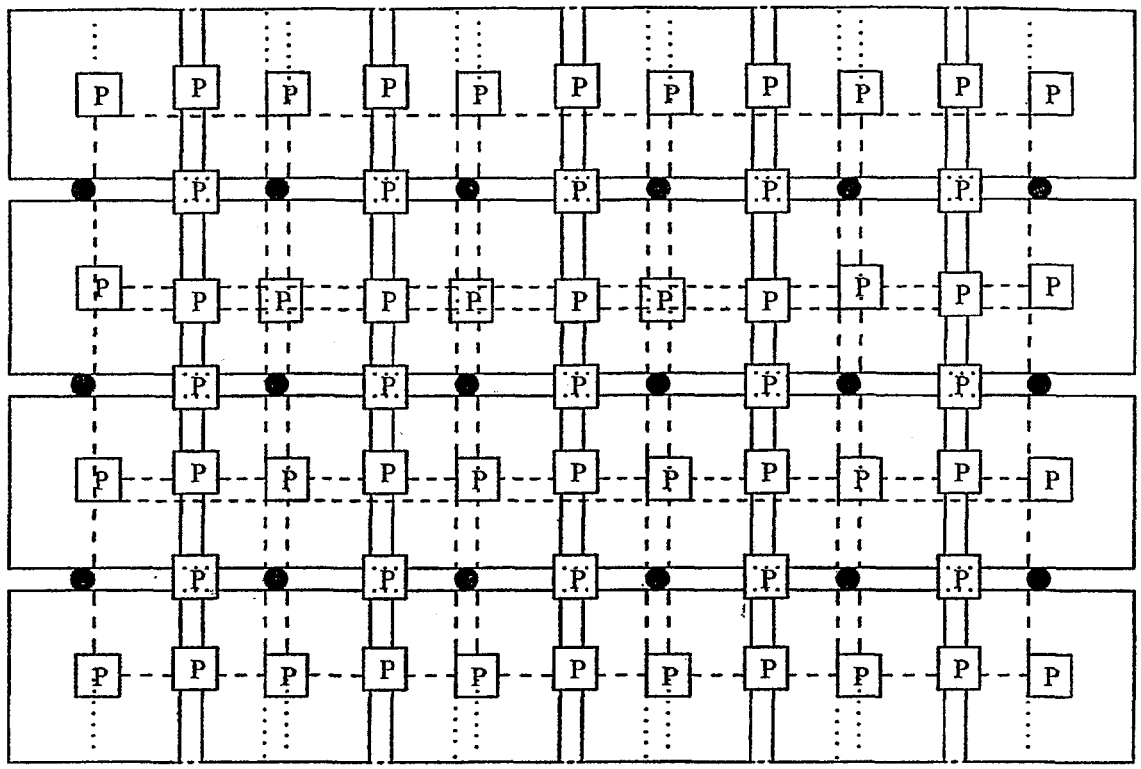
FIG. 39 shows three overlapped layers of square spiral windings including the location of the flux maxima and minima.
Figure 40:
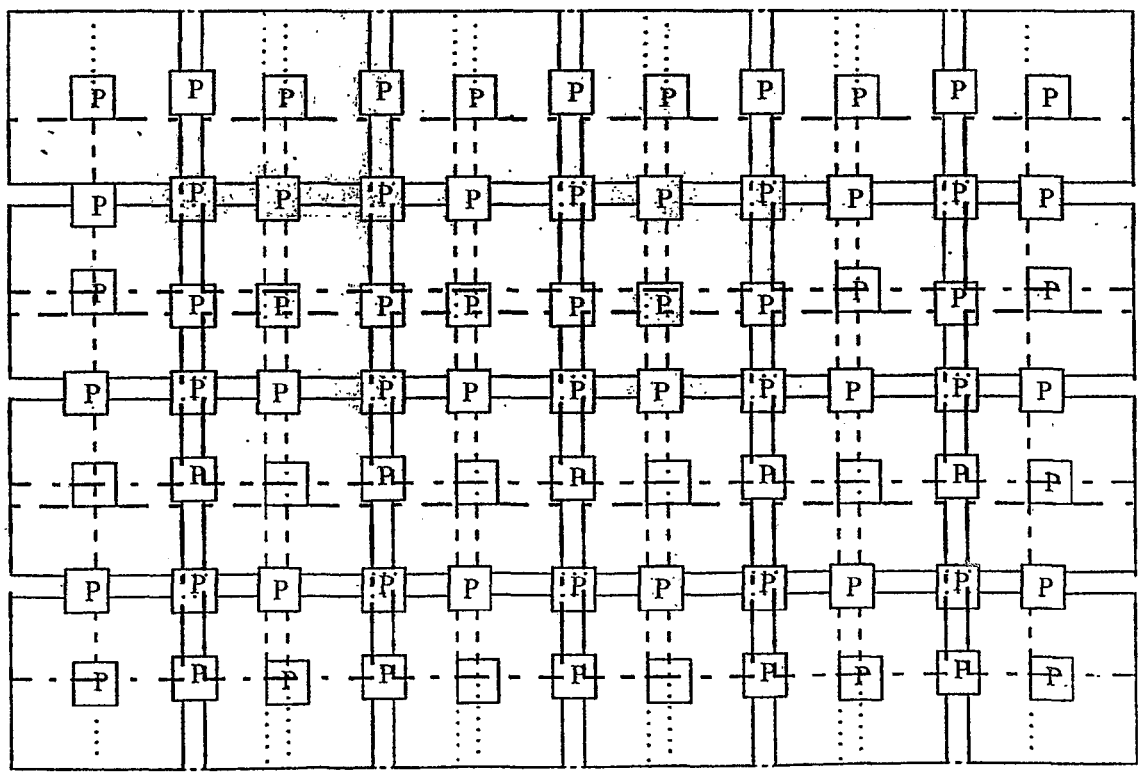
FIG. 40 shows four overlapped layers of square spiral windings including the location of the flux maxima and minima.

In order to reduce the mmf ripples on the surface, the peak (P) positions of a second layer of square-spiral PCB winding array can placed over some of the valley positions (•) as shown in FIG. 38. When a third layer of square-spiral PCB winding array is added to the structure in FIG. 38, the resultant layout is shown in FIG. 39. It can now be observed that one more layer of the square-spiral PCB windings is needed to fill up all the valleys with peaks as shown in FIG. 40.

The inductive battery charging platform described above, which can be regarded as the primary circuit of a transformer system (or the primary inductive charging system), can be used as a standard battery charging platform for portable electronic equipment with compatible inbuilt secondary circuitry in the electronic equipment to be charged. However, existing electronic equipment that is not designed for compatibility with the abovedescribed battery charging platform cannot take advantage of the convenience offered by the battery charging platform. Another embodiment of the present invention therefore provides both a battery charging system that can stand independently and can be used to charge existing conventional devices, and a means by which a conventional electronic device can be charged using the charging platform described above.

Figure 41:
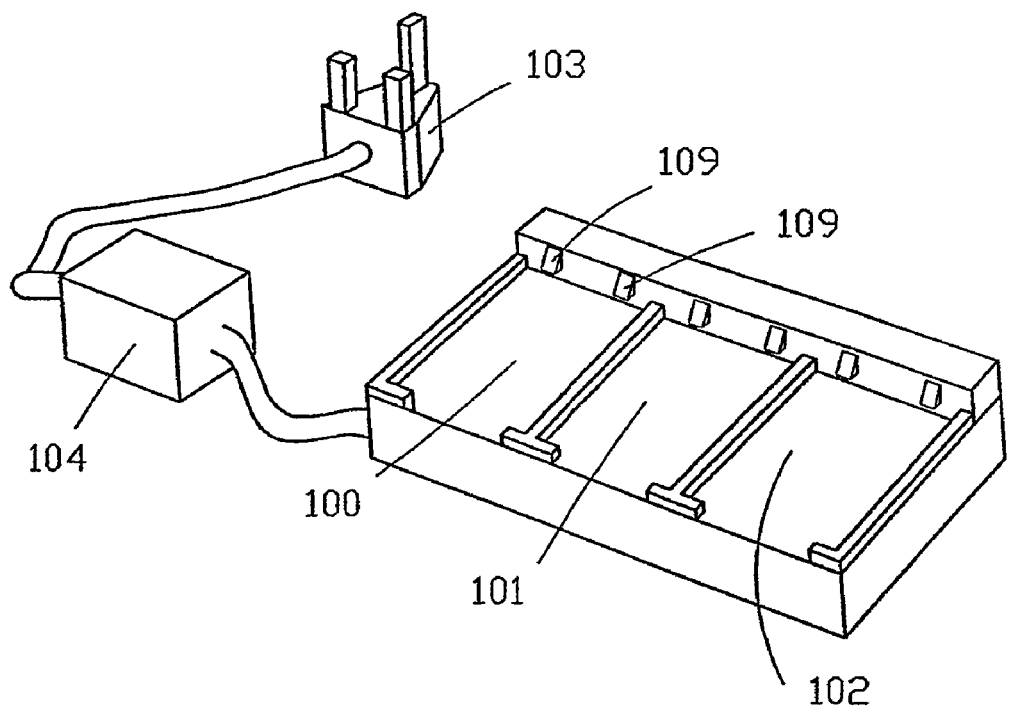
FIG. 41 illustrates a battery charging system according to a further embodiment of the invention.

Referring firstly to FIG. 41 there is shown therein a perspective view of a part of a battery charging system according to an embodiment of the present invention. The part of the charging system shown in FIG. 41 may be termed the primary inductive charging system since as will be explained below it comprises at least one primary winding. The part of the battery charging system shown in FIG. 41 may also be considered to be an extension system since in preferred forms it may be adapted to charge multiple devices and is therefore analogous to a conventional extension lead that allows multiple items of electronic equipment to share the same power socket.

The charging system is provided with multiple charging slots 100,101,102 for receiving secondary charging modules to be described further below. As will be explained further below each charging slot is provided with a primary winding. FIG. 41 shows a schematic of the primary inductive charging extension system with three charging slots. However, it should be noted that the number of slots is not restricted to three and can be as few as a single charging slot, or can be more than three. It will be understood that the number of charging slots dictate the number of devices that can be charged simultaneously. The primary charging extension system is connected to the mains through a plug 103 and includes a power electronic circuit 104 that provides a high-frequency (typically in the range of 1 kHz to 2 MHz) AC voltage to the primary windings that are located under the charging slot surfaces. It should be noted that the surfaces of the slots are flat and the slots are separated from each other by dividing walls. Each slot is therefore the same size as the surface of a housing of a secondary module to be described below, and the separating walls and mechanical switches to be described below together act to engage a secondary module and hold it in a correct orientation for efficient charging.

Figure 42:
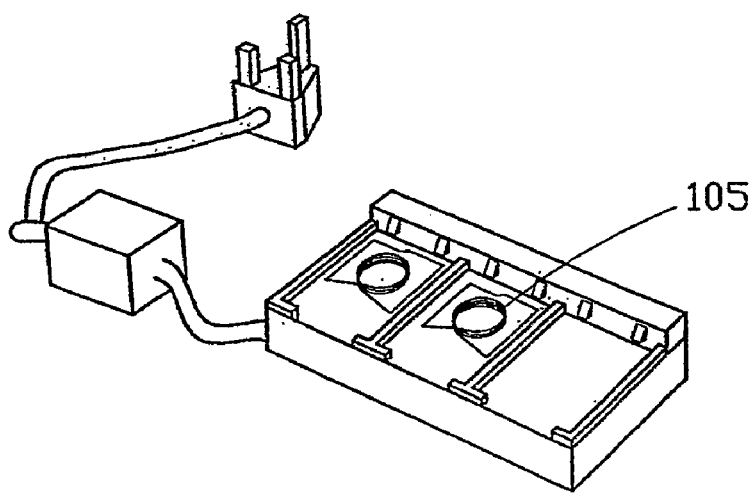
FIG. 42 is a view similar to FIG. 41 but part broken away to show the primary winding.
Figure 43:
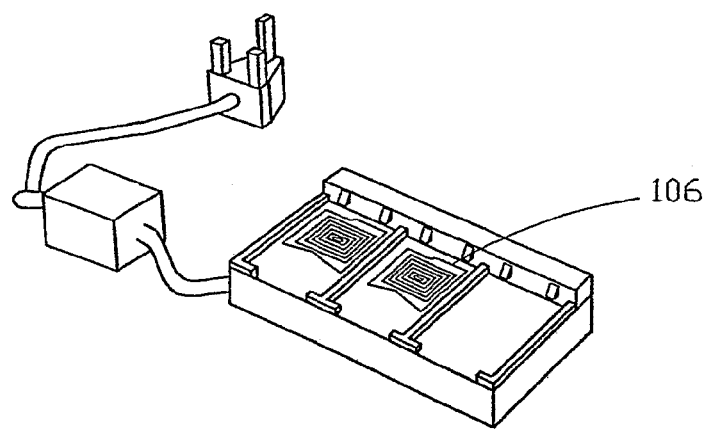
FIG. 43 is a view similar to FIG. 42 but of an alternate embodiment.
Figure 44A:
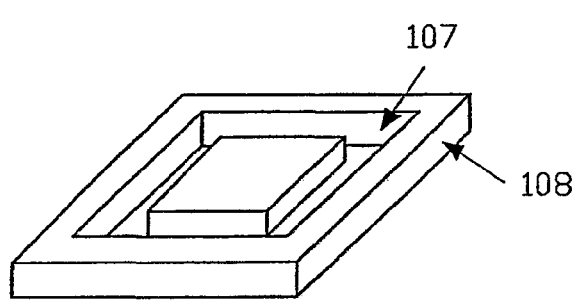
FIGS. 44(a) and (b) illustrate possible magnetic cores for use in the embodiment of FIG. 42.
Figure 44B:
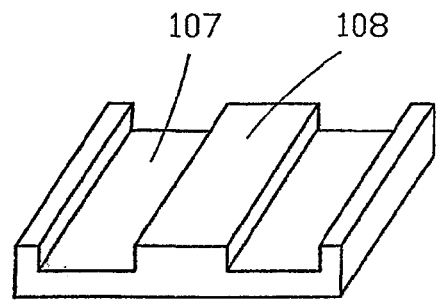
Figure 45:
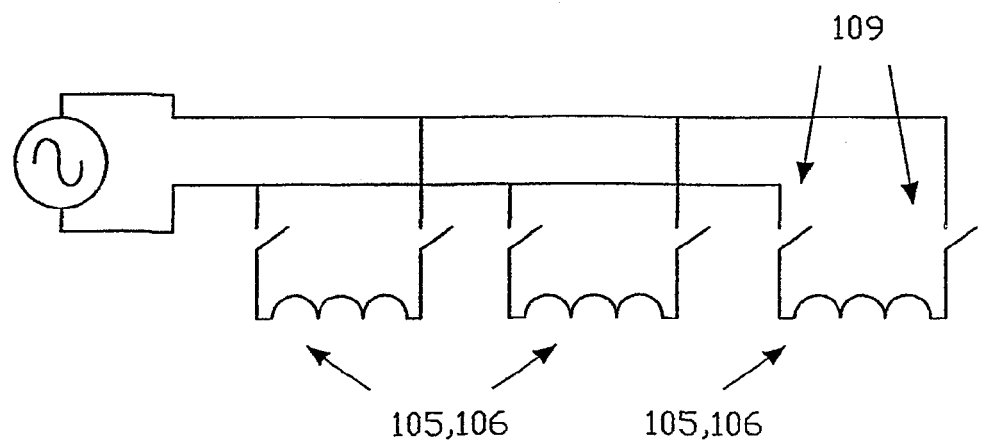
FIG. 45 shows an equivalent circuit for the charging system of an embodiment of the invention.

Each primary winding can be a coil 105 as shown in FIG. 42 or a printed circuit-board (PCB) winding 106 as shown in FIG. 43. If the primary winding is a coil 105, the coil 105 is preferably accommodated in a space 107 defined by a magnetic structure 108 such as the two examples shown in FIGS. 44(a) and (b) in which the coil is wound around a magnetic core 108. If a PCB winding is used, appropriate electromagnetic (EM) shielding, such as the combined use of ferrite and copper sheets described in U.S. Pat. No. 6,501,364, can be placed under the PCB winding in order to ensure that the magnetic flux generated in the PCB winding will not penetrate through the base of the primary inductive charging extension system. Preferably, mechanical switches 109 can be provided in each charging slot that when closed activate the primary winding to the high-frequency AC voltage source when the secondary charging module (to be described below) is inserted in that particular slot. As discussed above, the mechanical switches may also serve to engage and hold the secondary module in place. This mechanism ensures that only windings in the slots used by the secondary modules are excited by the high-frequency AC voltage source. The equivalent circuit is shown in FIG. 45.

It will also be understood that the primary winding could be constructed as a multiple layer structure as discussed above in order to provide a particularly preferred even flux distribution over the charging surface.

Figure 46:
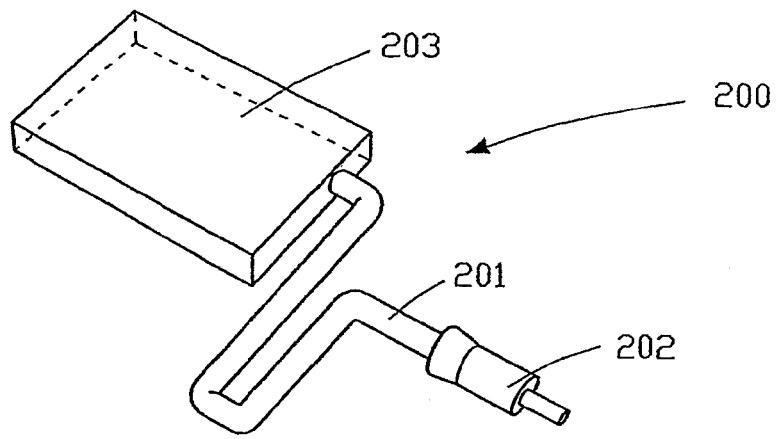
FIG. 46 illustrates an example of a secondary module for use in an embodiment of the invention.

FIG. 46 shows a typical secondary charging module 200 for use with the primary charging extension system shown in FIG. 41. Each secondary module has a conventional cable 201 and charger connecter 202 that is adapted to be received within the charging socket of a conventional electronic device. It will be understood that different secondary charging modules 200 may be provided differing only by the type of the connector 202. Each secondary charging module 200 is provided with a housing 203 that contains a secondary circuit to be described below. The housing is preferably rectangular (but of course could be any suitable shape) and of such a size that it may be received in one of the slots 100-102 of the primary charging extension system. The housing 203 should have at least one preferably flat surface for placing on the charging slot of the primary charging extension system. This flat surface is preferably parallel to the plane of the secondary winding within the housing such that when the secondary module is placed in a slot of the primary extension system the secondary winding is substantially parallel to the primary winding beneath the surface of the slot. The housing 203 of the secondary module should preferably be made of non-conductive and non-ferromagnetic material so that no current will be induced in the housing material.

Figure 47:
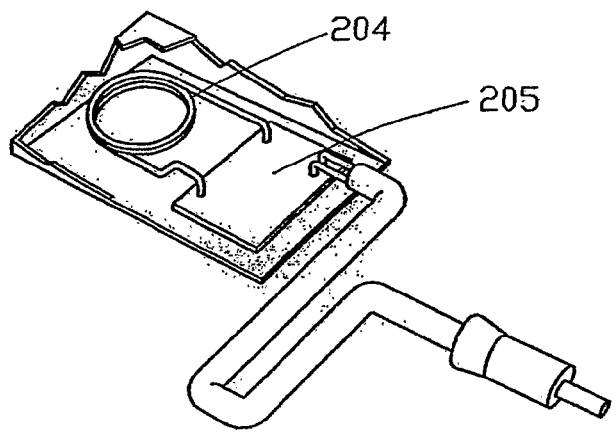
FIG. 47 shows a part broken away view of secondary module of an embodiment of the invention.
Figure 48:
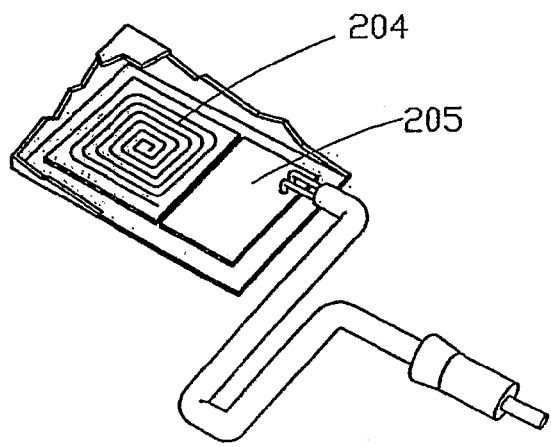
FIG. 48 is a view similar to FIG. 47 but of a further embodiment.

As can be seen from FIGS. 47 and 48 inside each secondary charging module 200 are at least one secondary winding 204 and charger circuitry 205 that receives the induced AC voltage in the secondary winding and provides a regulated DC output voltage for the charging purpose. The secondary winding should be kept inside the housing. The secondary winding can be a coil (FIG. 47) or it can be printed on a PCB (FIG. 48). The function of the secondary winding is to act as the secondary winding of a transformer system to pick up the changing magnetic flux generated by the primary winding of the primary charging extension system.

The secondary coil or PCB winding should be placed close to the (preferably flat) surface of the housing of the secondary charging module so as to pick up maximum changing AC magnetic flux from the primary inductive charging extension system or platform. According to Faraday's Law, an AC voltage will be induced across the secondary winding if the secondary winding senses a changing magnetic flux (that can be generated by the primary winding in the primary inductive charging system).

Figure 49:
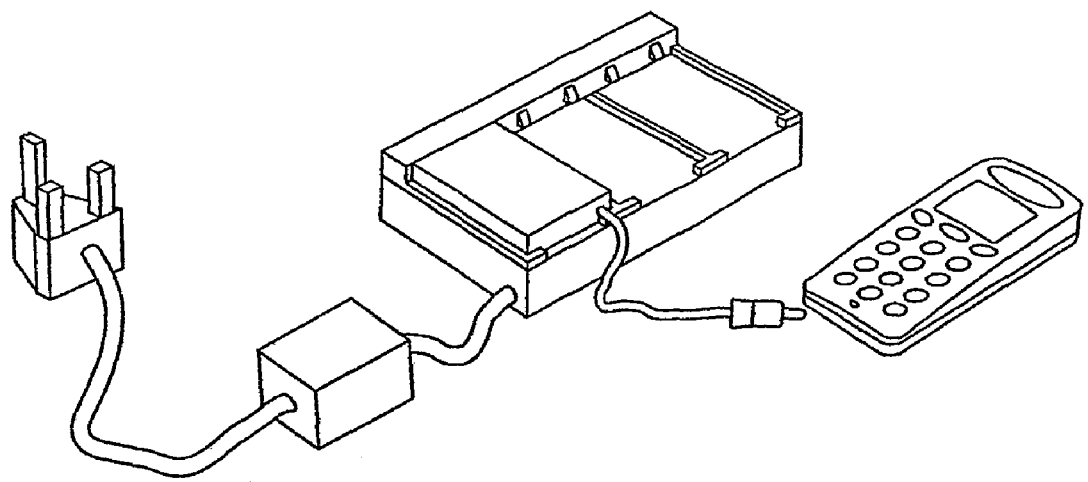
FIG. 49 is a view showing the complete charging system according to an embodiment of the invention.

The terminals of the secondary winding are connected to the input terminals of an electronic circuit 205 that (1) performs the AC-DC power conversion function (i.e., rectifying the AC voltage into DC) and (2) preferably also regulate the DC voltage to a desired value (typically in the range from 3V to 24V) within a certain tolerance. Through a cable and a charger connector for connecting to charging socket in the portable equipment, this DC voltage can be used to charge the portable equipment a shown in FIG. 49.

Figure 50:
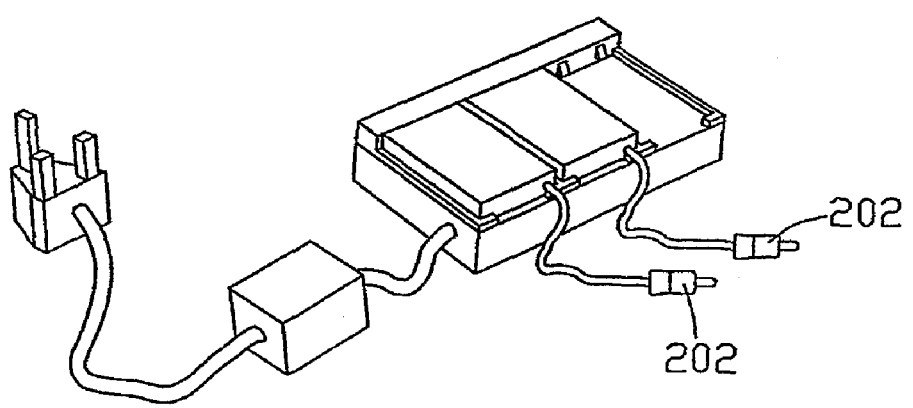
FIG. 50 is a view similar to FIG. 49 but showing how the charging system according to an embodiment of the invention can be used to charge multiple devices having different forms of charging connections.

The secondary winding design (such as number of turns and dimensions of windings), the DC regulated voltage level and the type of connector can be designed according to the charging requirements of specific electronic products. Therefore, different secondary charging modules can be designed for different ranges of products, but all secondary modules are compatible with the same primary charging extension system as shown in FIG. 50 in which two different types of secondary modules adapted for charging different devices and having different connectors 202,202' are shown in adjacent slots of the primary charging extension system. As the primary inductive charging extension system preferably has several charging slots for accommodating the secondary charging modules, it can be used to charge several items of conventional portable electronic equipment simultaneously.

Figure 51:
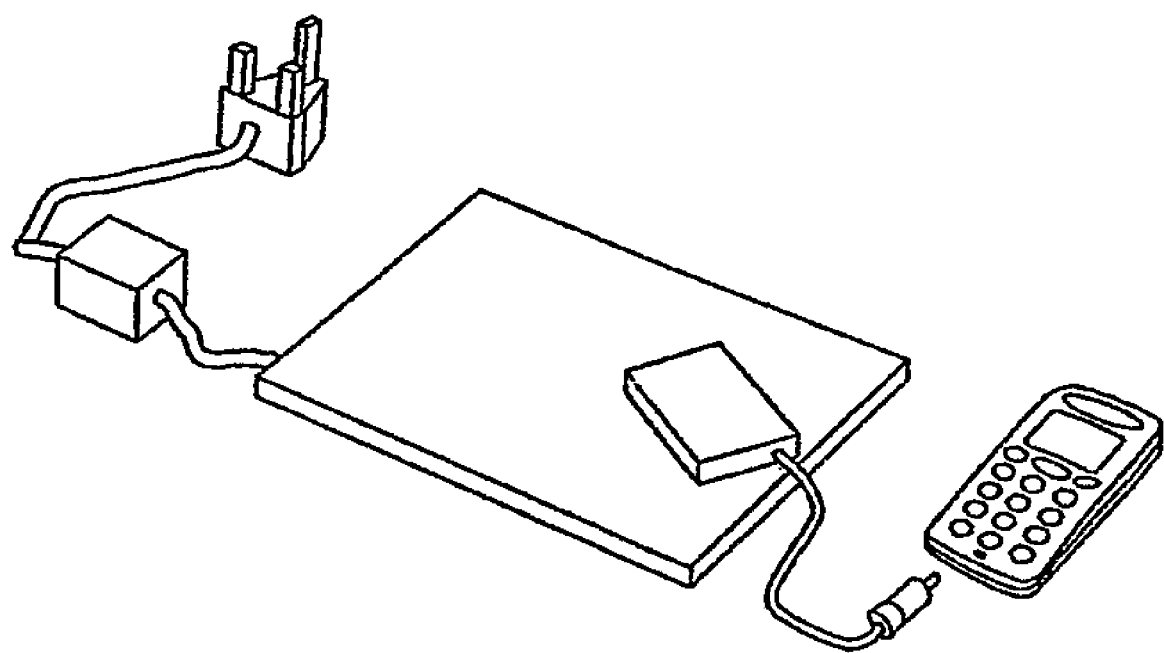
FIG. 51 is a view illustrating how an embodiment of the present invention can be used to enable a conventional electronic device to be charged using an inductive charging platform as shown in FIG. 4.

A further advantage of the secondary charging module is that it allows a conventional electronic device to be charged using the inductive battery charging platform described above. Although a conventional electronic device cannot be charged by placing it directly on the charging platform surface because it does not have the in-built secondary winding, instead a secondary charging module can be placed in the inductive charging system and charge the conventional device therefrom as shown in FIG. 51

In principle, the housing of the secondary charging module can have more than one preferably flat interface surface. If the housing is a cuboid it will have two large opposed interface surfaces (e.g., upper and lower surfaces of a relatively thin flat cuboid structure a shown in the Figures) and with this cuboid design, either interface surface of the secondary module housing can be placed on the charging slots of the primary inductive charging extension system or other charging platform. This cuboid design makes the secondary charging modules very user-friendly because it does not matter which way up the housing of the secondary module is placed on the primary charging surface.

In summary, a preferred embodiment of the secondary charging module consists of:
 a non-conductive housing that has at least one surface (and preferably two surfaces) for placing on the charging slot of the primary charging extension system or the charging platform and that accommodates the secondary winding and circuitry for charging the electronic equipment;
 a secondary winding, that can either be printed in a printed-circuit-board (PCB) or a conductor coil; and
 an AC-DC power conversion circuit that converts the ac induced voltage picked by the secondary winding from the primary AC voltage excitation into a regulated or unregulated DC voltage, typically in the range from 3V to 24V, a conventional cable that connects the DC voltage output of the secondary circuitry to a connector that is compatible with the charging socket in the conventional electronic equipment.

It will thus be seen that, at least in preferred forms, the charging system of the present invention including the proposed secondary charging modules offers users a convenient and user-friendly battery charging system for a wide range of portable electronic equipment. Using the appropriate charger connectors that are compatible with different portable equipment, the proposed charging system enables one single charging system (that occupies only one power point or socket in the ac mains) to charge a wide range of electronic equipment.

The present invention, at least in preferred forms, provides a new charging system allows more than one piece of equipment to be charged simultaneously, and regardless of their orientations on the charging surface, and allows a movable device to be charged while it moves over the charging surface.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A battery powered portable electronic device comprising a rechargeable battery, and wherein said portable device includes a planar secondary winding for receiving electrical energy from a battery charger, and electromagnetic shielding between said winding and the major electronic components of said device, wherein said secondary winding lies in a plane parallel to a surface of said device adapted to be placed on a charging surface of a battery charging system, wherein said device is capable to being carried or moved by hand.

2. An electronic device as claimed in claim 1 wherein said shielding comprises a sheet of ferrite material and a sheet of conductive material.

3. An electronic device as claimed in claim 1 wherein said winding is formed integrally with a back cover of said device.

4. A secondary module for a battery charging system, comprising: a housing having at least one charging surface, a secondary winding provided in said housing parallel to said surface and adapted to receive magnetic flux when said surface is brought adjacent to a primary winding, circuit means for converting alternating current in said secondary winding to a regulated DC output, and a connector means for connecting said DC output to the charging socket of an electronic device.

* * * * *